(12) United States Patent
Mori et al.

(10) Patent No.: US 7,107,454 B2
(45) Date of Patent: Sep. 12, 2006

(54) SIGNATURE SYSTEM PRESENTING USER SIGNATURE INFORMATION

(75) Inventors: Nobuyuki Mori, Yokohama (JP); Michihiro Miyasaka, Kawasaki (JP); Takayuki Yamaguchi, Tokyo (JP)

(73) Assignees: Fujitsu Limited, Kawasaki (JP); Sumitomo Mitsui Banking Corporation, Tokyo (JP)

( * ) Notice: Subject to any disclaimer, the term of this patent is extended or adjusted under 35 U.S.C. 154(b) by 692 days.

(21) Appl. No.: 09/771,896

(22) Filed: Jan. 30, 2001

(65) Prior Publication Data

US 2001/0025272 A1    Sep. 27, 2001

Related U.S. Application Data

(63) Continuation of application No. PCT/JP99/04185, filed on Aug. 3, 1999.

(30) Foreign Application Priority Data

Aug. 4, 1998  (JP) ................... 10-220658

(51) Int. Cl.
*H04L 9/00* (2006.01)
(52) U.S. Cl. .............. 713/180; 713/156; 713/179; 713/181; 713/182; 726/5; 726/18; 726/19
(58) Field of Classification Search .............. 713/180, 713/156, 179, 181, 182; 705/76; 340/5.6; 726/5, 8, 19
See application file for complete search history.

(56) References Cited

U.S. PATENT DOCUMENTS

| 4,885,778 | A | 12/1989 | Weiss |
| 4,998,279 | A | 3/1991 | Weiss |
| 5,023,908 | A | 6/1991 | Weiss |
| 5,058,161 | A | 10/1991 | Weiss |
| 5,097,505 | A | 3/1992 | Weiss |
| 5,367,572 | A | 11/1994 | Weiss |
| 5,689,567 | A * | 11/1997 | Miyauchi ................ 713/176 |
| 5,742,685 | A * | 4/1998 | Berson et al. ............. 713/186 |
| 5,913,542 | A * | 6/1999 | Belucci et al. ............. 283/75 |
| 5,948,103 | A * | 9/1999 | Fukuzaki .................. 713/200 |
| 6,030,001 | A * | 2/2000 | Kruckemeyer ............. 283/70 |
| 6,031,464 | A * | 2/2000 | Matsumoto et al. ....... 340/5.86 |
| 6,081,610 | A * | 6/2000 | Dwork et al. ............. 382/119 |
| 6,104,809 | A * | 8/2000 | Berson et al. ............. 713/186 |
| 6,105,013 | A * | 8/2000 | Curry et al. ............... 705/65 |
| 6,212,281 | B1 * | 4/2001 | Vanstone ................. 380/282 |
| 6,292,092 | B1 * | 9/2001 | Chow et al. .............. 340/5.6 |
| 6,360,321 | B1 * | 3/2002 | Gressel et al. ............ 713/172 |
| 6,601,172 | B1 * | 7/2003 | Epstein ................... 713/178 |

FOREIGN PATENT DOCUMENTS

| EP | 0 234 100 B1 | 9/1987 |
| EP | 0 806 748 A2 | 11/1997 |
| JP | 63-24384 | 2/1988 |
| JP | 63-244288 | 10/1988 |
| JP | 5-225369 | 9/1993 |

(Continued)

*Primary Examiner*—Hosuk Song
*Assistant Examiner*—Beemnet Dada
(74) *Attorney, Agent, or Firm*—Staas & Halsey LLP

(57) ABSTRACT

A user inputs identification information in a terminal, and generates identification information and bar code information about a signature program. A receiver reads the bar code information of the user using a bar code reader. The bar code reader executes a signature program, generates signature information containing the identification information of the user, and requests a certification device to verify the signature information.

15 Claims, 26 Drawing Sheets

FOREIGN PATENT DOCUMENTS

| | | |
|---|---|---|
| JP | 5-250389 | 9/1993 |
| JP | 5-266285 | 10/1993 |
| JP | 8-272742 | 10/1996 |
| JP | 9-6232 | 1/1997 |
| JP | 9-297828 | 11/1997 |
| JP | 10-11509 | 1/1998 |
| WO | WO 95/34042 | 12/1995 |

* cited by examiner

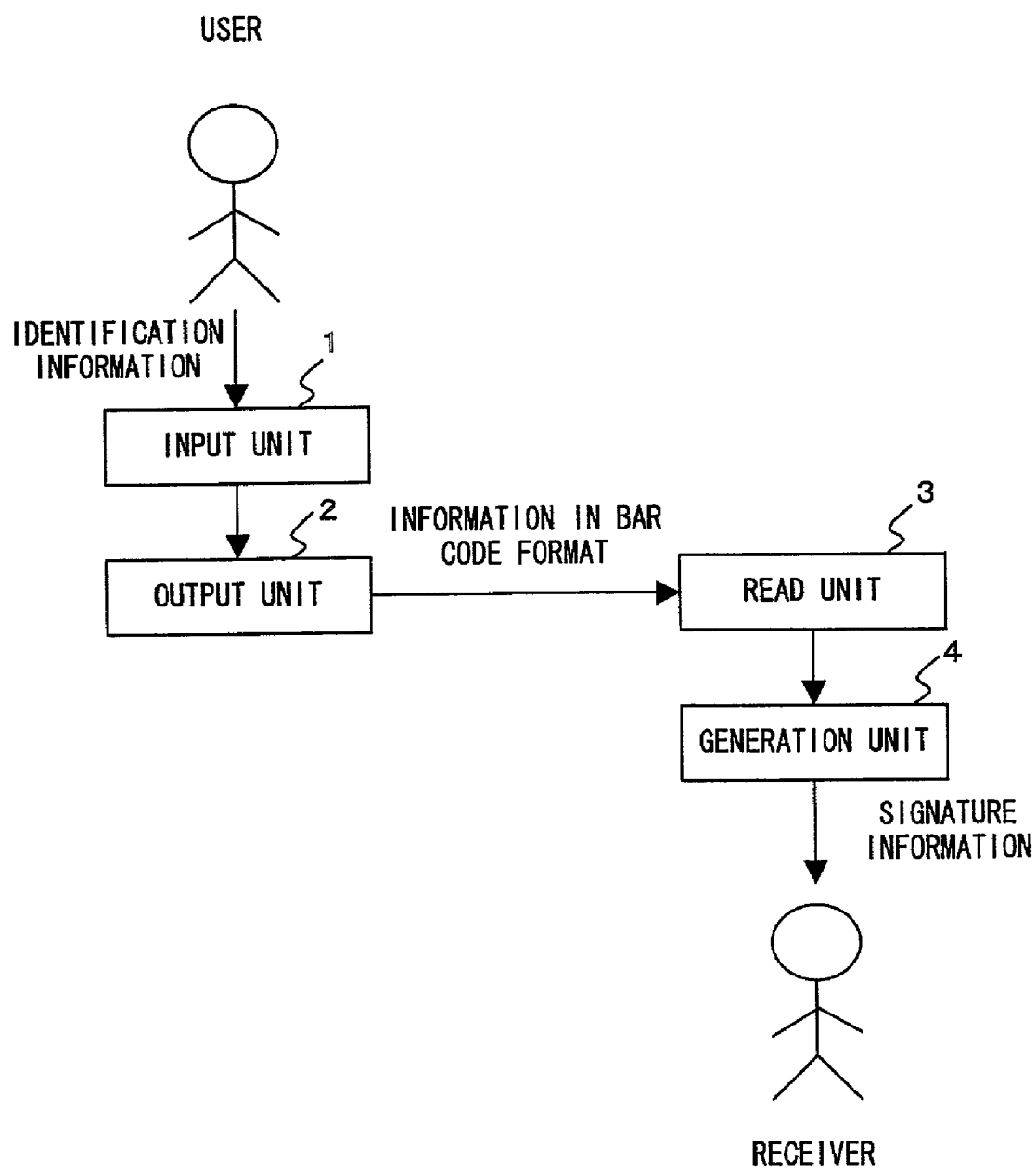
F I G. 1

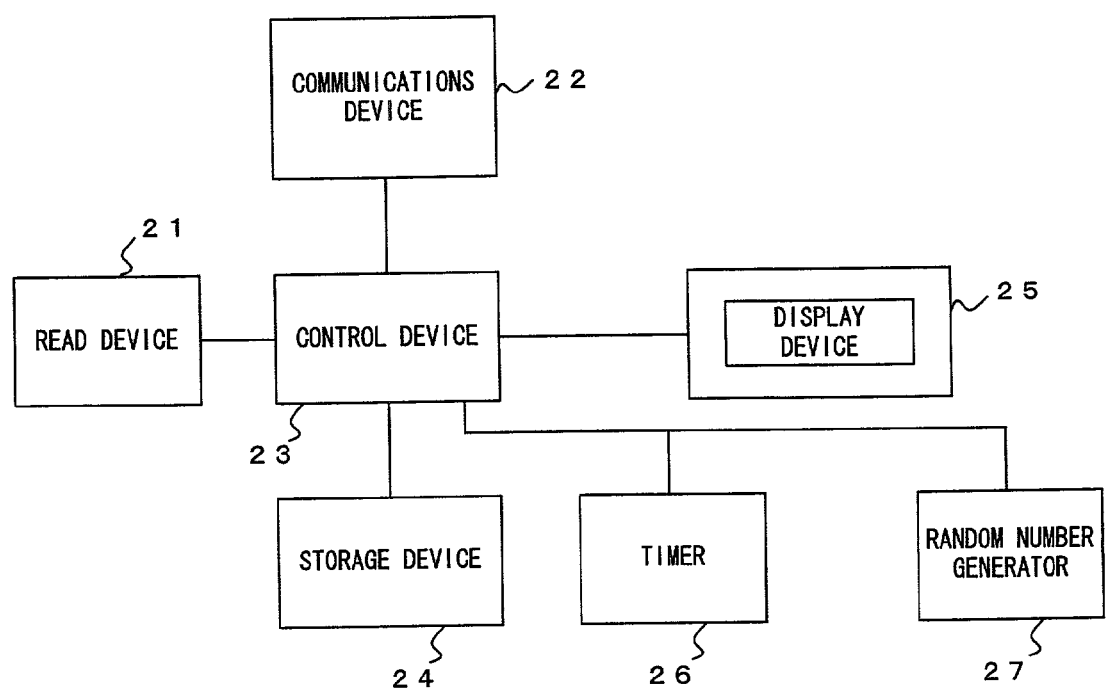
F I G. 3

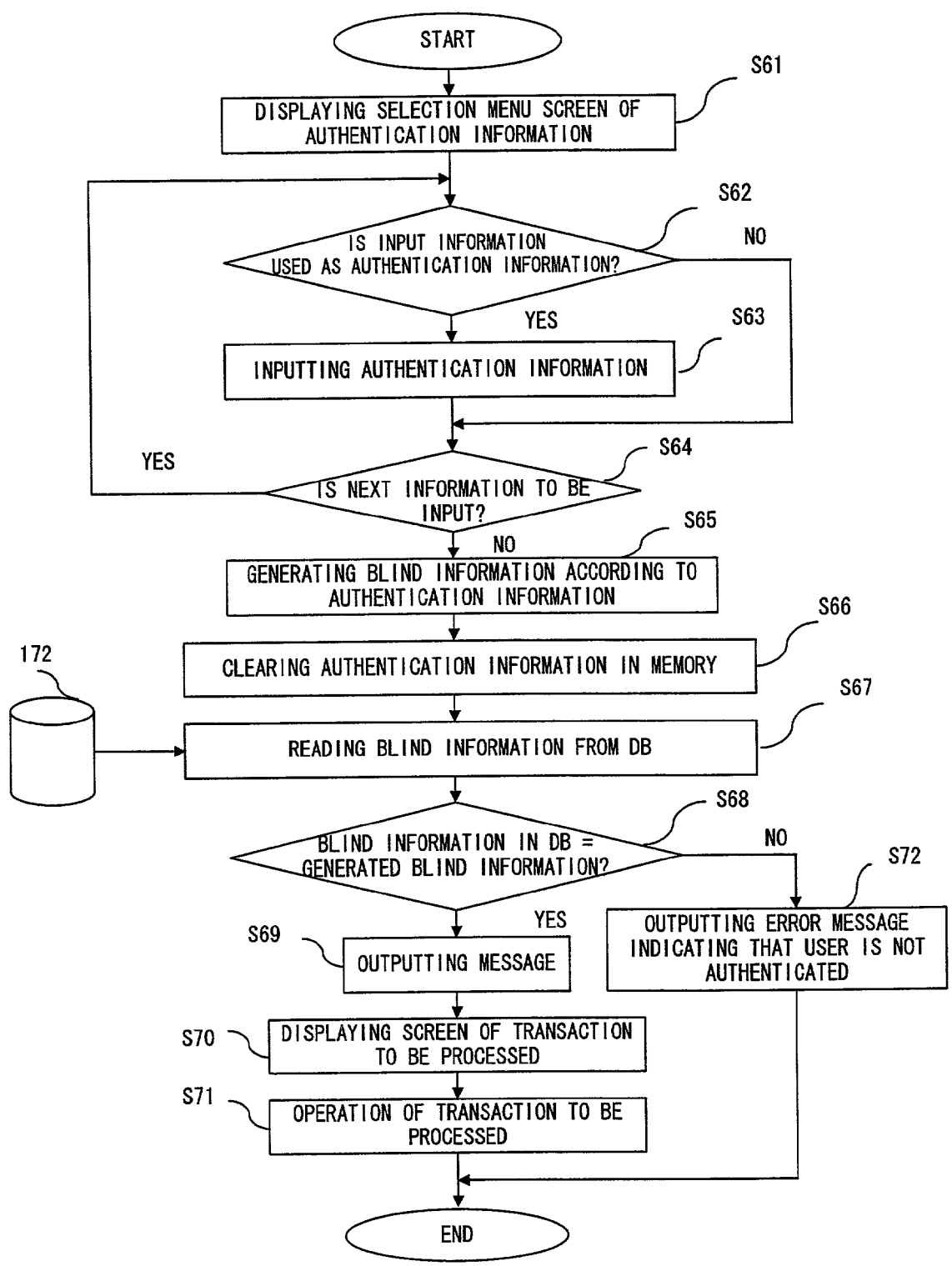
F I G. 20

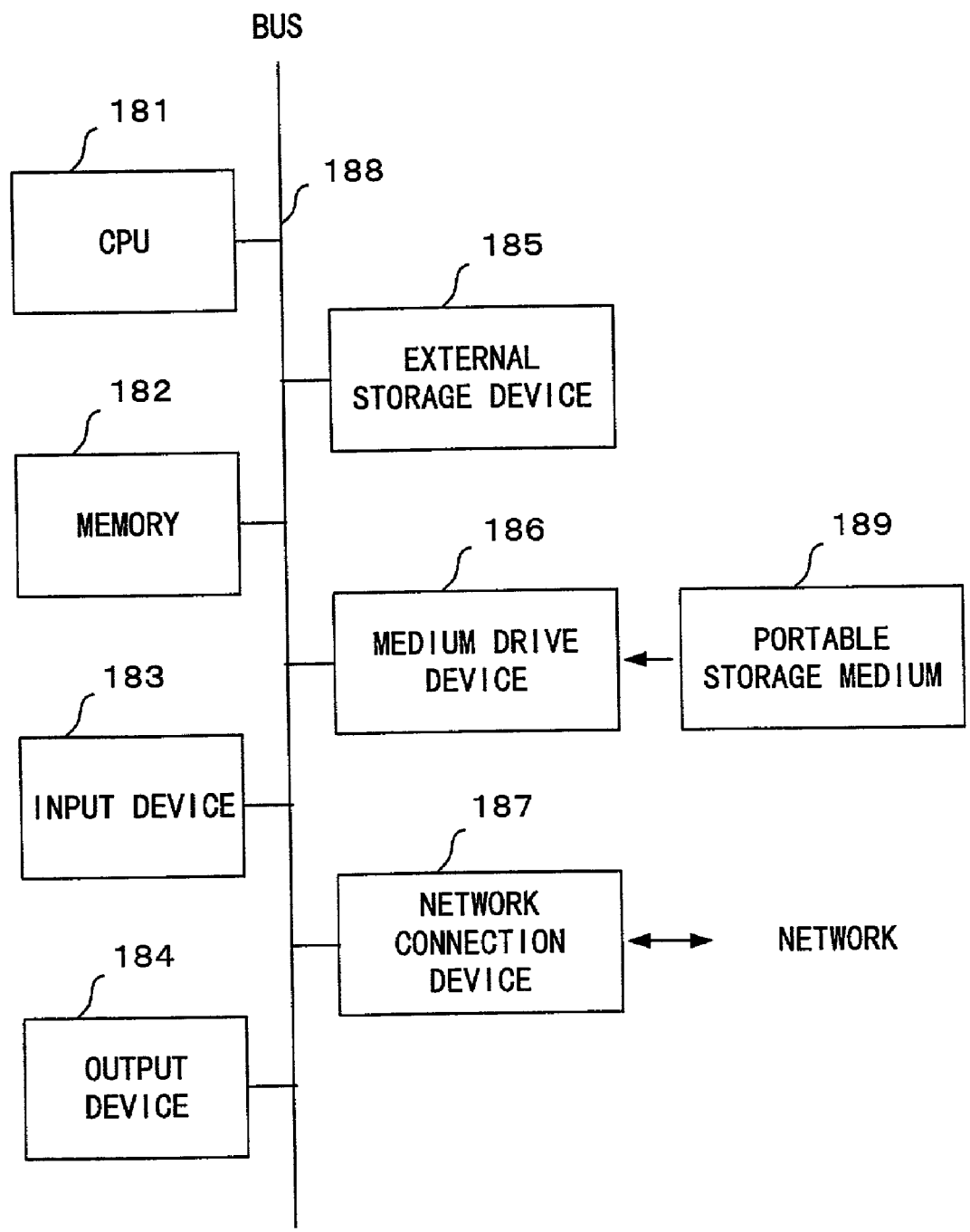
F I G. 25

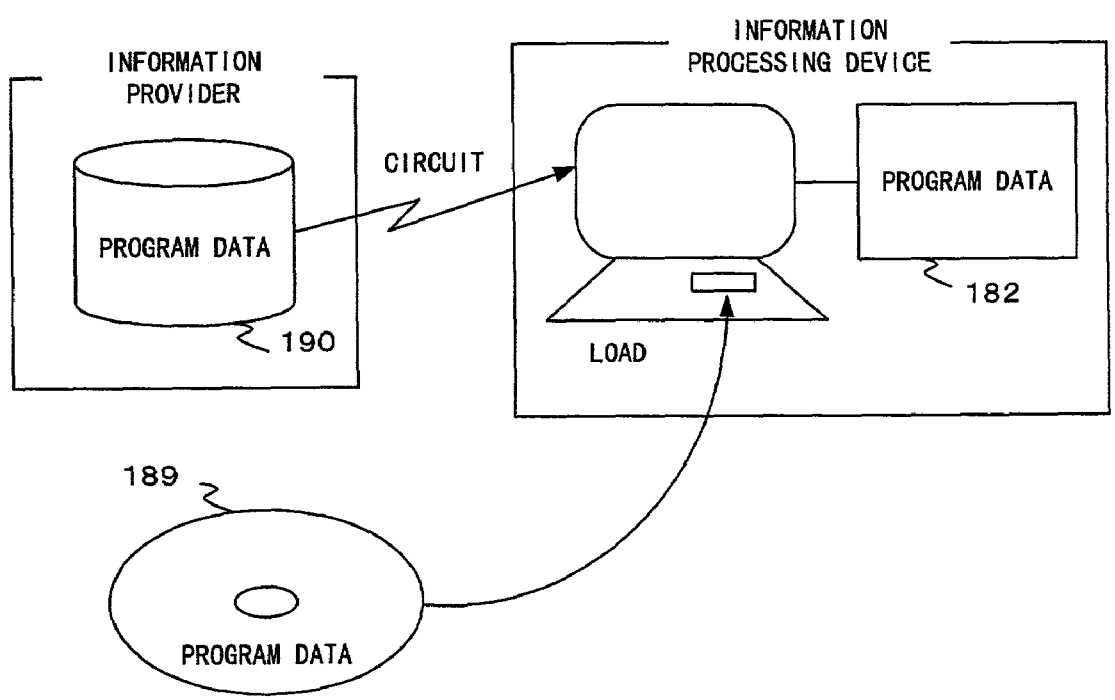
F I G. 2 6

SIGNATURE SYSTEM PRESENTING USER SIGNATURE INFORMATION

CROSS REFERENCE TO RELATED APPLICATION

This application is a continuation of International PCT Application No. PCT/JP99/04185 filed on Aug. 3, 1999.

BACKGROUND OF THE INVENTION

1. Field of the Invention

The present invention relates to a signature system which presents the information that the user is authenticated in receiving delivered goods, in a transaction with financial facilities, in various transactions with other users, etc.

2. Description of the Related Art

In the Asian countries including Japan, people conventionally have the custom of writing their signatures accompanied by their own seals for authentication. For example, in Japan, a registered seal is used for an important transaction of real estate, etc., a banking seal is used for a transaction with a bank, and a receipt seal is used for reception of delivered goods. In the countries where there is no custom of using those seals in transactions, it is common to put a signature for agreement.

However, a signature can be forged by others, and only a professional appreciator can correctly identify the signature. In addition, a seal can be forged, and it is also necessary to ask a professional appreciator to identify a seal as in the case of a signature. Therefore, when a signature and a seal are illegally used, the receiver is the document cannot correctly identify them.

In addition, electronic transactions of these days which can be realized through a computer network cannot be accompanied by a signature or a seal. That is, it is furthermore difficult to confirm for a receiver of a document to authenticate a correspondent as the person described on the document, or to determine whether or not the document is an illegal copy.

A password is used to identify a user, who is a customer in a transaction, in the conventional ATM (automatic teller machine) in financial facilities (bank, etc.). However, when significant information such as a user's telephone number, a user's birthday, etc. is used as a password, it is possibly stored on other paper medium, etc., and therefore can be easily guessed and illegally used by the third party. In addition, when insignificant information such as a random number string, etc. is used as a password, it is difficult for a use to correctly remember for a long time. As a result, the user often records his or her password on a paper medium, etc. which can be illegally searched by others.

Furthermore, financial facilities store and manage passwords in a medium such as a master database, etc. to have a matching check on input passwords. Accordingly, there is the possibility that the medium is illegally accessed by the third party to abuse the passwords.

SUMMARY OF THE INVENTION

The present invention aims at providing a signature system for presenting user identification information through an information processing device, and safely managing the information.

According to the first aspect of the present invention, a signature system comprises an input unit and an output unit and presents a receiver with signature information of a user.

The input unit inputs the identification information of the user and the output unit outputs information for generation of the signature information according to the input identification information in a format readable by a bar cord reader.

According to the second aspect of the present invention, a signature system comprises a reading unit and a generation unit and presents a receiver with signature information of a user.

The reading unit reads information in a bar code format and the generation unit generates the signature information according to the read information.

According to the third aspect of the present invention, a signature system comprises an input unit, a generation unit and an entry unit.

A user inputs authentication information, which is significant and repeatedly reproducible by the user, through the input unit. The generation unit generates blind information of the authentication information and the entry unit enters the blind information in a device verifying signature information according to the authentication information.

BRIEF DESCRIPTION OF DRAWINGS

FIG. 1 shows the principle of the signature system of the present invention;

FIG. 3 shows the configuration of the bar code reader;

FIG. 20 is a flowchart of the user authentication process;

FIG. 25 shows the configuration of the information processing device; and

FIG. 26 shows a storage medium.

DESCRIPTION OF PREFERRED EMBODIMENTS

Figure 2:
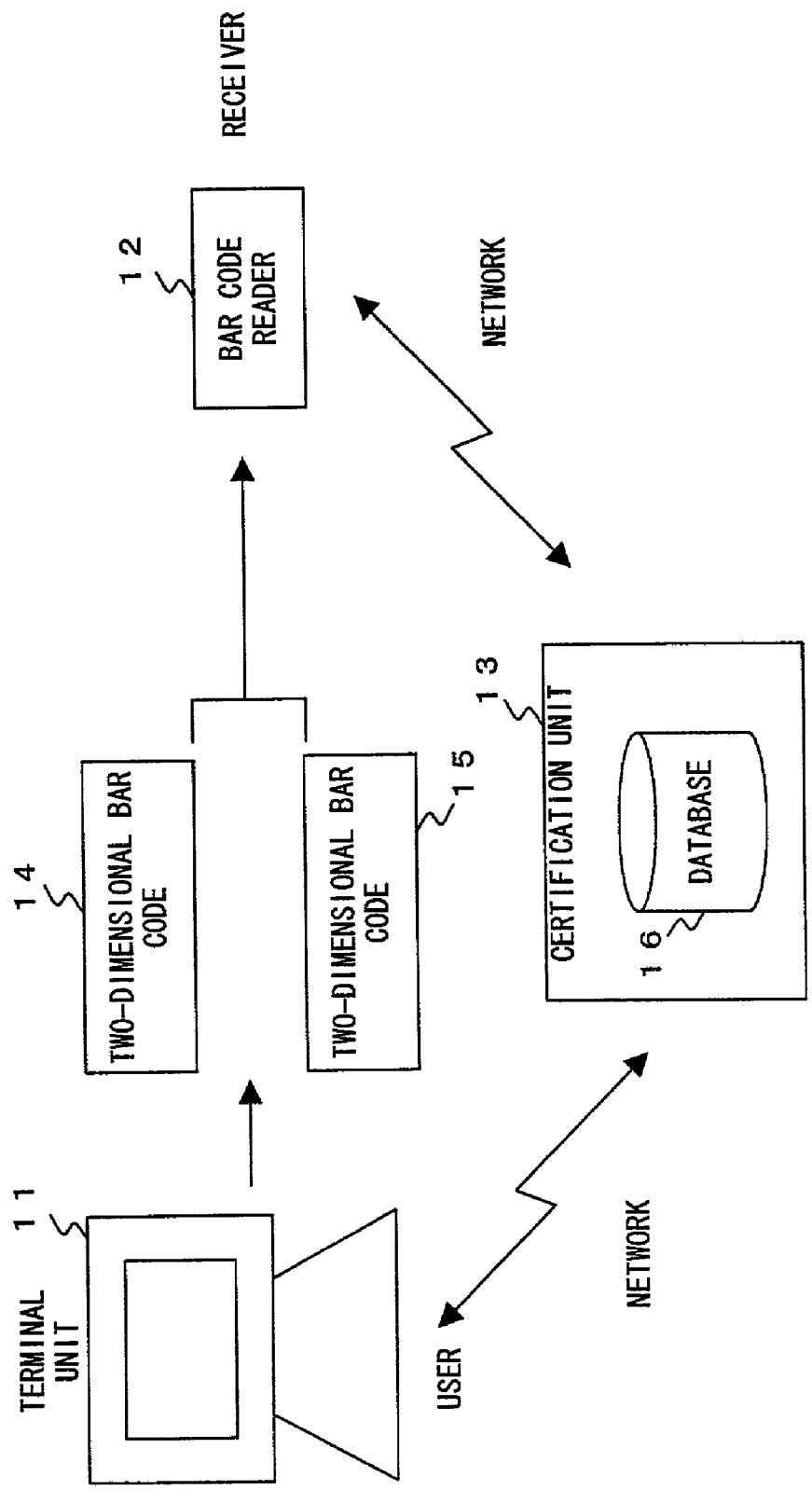
FIG. 2 shows the configuration of the first signature system.

The embodiments of the present invention are described below in detail by referring to the attached drawings.

FIG. 1 shows the principle of the signature system of the present invention. The signature system shown in FIG. 1 includes an input unit 1, an output unit 2, a read unit 3, and a generation unit 4, and presents user signature information with a receiver.

According to the first principle, the input unit 1 inputs user identification information, and the output unit 2 outputs the information for generation of signature information in a format readable by a bar code reader according to the input identification information.

The user identification information can be, for example, significant information repeatedly reproducible by a user, a print of a user's seal, etc., and can be input and managed as digital data. According to the identification information, necessary information is generated to obtain signature information, and the generated information is output in a bar code format. For example, output information contains user identification information, and information about a program for generating signature information using the identification information.

According to the second principle, the read unit 3 reads the information in the bar code format. The generation unit 4 generates signature information according to the read information.

The read unit 3 reads the information output from the output unit 2. In addition, the generation unit 4 executes, for example, a program contained in the read information, generates signature information containing the user identification information, and presents the receiver with the generated information.

With the above described signature system, since the information for generation of the signature information is output in the bar code format, and is transmitted to the receiver, it is very difficult for a user to understand the contents. Therefore, it is more difficult for the third party to illegally use the information than in the case in which a user's signature or seal is used, thereby guaranteeing higher security. In addition, the security can be furthermore improved by generating signature information with additional information added to user-input identification information, not by using the user-input identification information as is as signature information.

Furthermore, as user identification information, complicated information can be obtained in the range of the capacity of the bar code, and it becomes more difficult for the third party to correctly guess the information than in the conventional password. As a result, it is next to impossible to generate the information for generation of signature information by a person other than the user inputting correct identification information.

For example, the input unit 1 and the output unit 2 shown in FIG. 1 correspond to a terminal unit 11 shown in FIG. 2 described later. The read unit 3 and the generation unit 4 shown in FIG. 1 correspond to a bar code reader 12 shown in FIG. 2 and a bar code reader 82 shown in FIG. 11. Furthermore, the information for generation of signature information corresponds to two-dimensional bar codes 14 and 15 shown in FIG. 2.

The signature system according to the present invention stores authentication information on a write-protected medium such as a two-dimensional bar code, etc. instead of putting a user signature and seal when presenting the processing device of the receiver with the signature information authenticating the user in receiving home-delivered goods and presenting transaction documents, etc. Then, the signature system has the stored information read by the processing device.

This authentication information is stored in the user mind as significant information, can be correctly stored there forever, and can be repeatedly recalled as necessary. Therefore, the user need not store the authentication information on a paper medium, etc., and it is very difficult for other users to be informed of the information.

The authentication information can be, for example, user personal information (name, address, telephone number, birthday, hobby, specialty, family name before marriage, etc.), the members of a user family, user ancestry information (personal information of user ancestry, etc.), user's favorite words (idiom, maxim, verse of a poem, family motto, etc.), persons respected by the user, etc.

To improve the security, two or more items listed above should be combined. The user can select the items depending on the type of transaction. The complexity of the authentication information depends on the combination of the items, and can change the application of a digital signature (digital seal). The user selects items from among a number of items and inputs them as his or her authentication information, and changes the number of item to be entered depending on the usage.

For example, when the authentication information is used as a registered seal, the user combines three or more items to generate a level-1 digital signature. When the authentication information is used as a banking seal, the user combines two or more items to generate a level-2 digital signature. When the authentication information is used as a receipt seal, the user uses only one item to generate a level-3 digital signature. In addition, plural pieces of information belonging to the same item such as three types of 4-character idioms can be combined.

A two-dimensional bar code can output information of 2,000 through 3,000 alphanumeric characters, and 600 through 700 Japanese characters.

In addition, the processing device which reads the authentication information dynamically generates blind information for protection against illegal use by the third party when signature information is generated from the authentication information, and embeds the blind information into the signature information. Blind information refers to information obtained by converting given information using unidirectional function such as a hash function, etc., or generated using the conversion result. The original information cannot be read from the blind information.

The program for generating the blind information contains a user-exclusive one directional function and an encryption key, is stored on a two-dimensional bar code, and is read by the processing device with the authentication information.

When the processing device reads two-dimensional bar code information, it reserves a dynamic digital data write area corresponding to the authentication information, a digital data storage area corresponding to the blind information, and a program storage area. When the processing device reads a two-dimensional bar code, it writes the authentication information to the dynamic write area, and loads a program onto the storage area.

When the program is read and executed, non-recallable data such as signature date and time, a dynamically obtained random number, etc. is written as use information. The use information indicates that the authentication information has been used. Then, a unidirectional function is applied to the use information, the application result is encrypted using an encryption key to generate blind information, and the generated information is written to the storage area of the blind information.

Then, the program generates the signature information from the authentication information, the use information, and the blind information of the use information, stores the generated information in the processing device, and deletes itself from the storage area. In addition, if the name, etc. of the receiver is added to the use information, the security of the signature information can be furthermore improved.

According to the above described signature system, since the authentication information is converted into the signature information and stored in the processing device, and the authentication information in comprehensible text is not stored anywhere, it is extremely hard for the third party to illegally use the information.

In addition, if a receiver or the third party uses a copy of the stored signature information as is for other purposes, the information is provided with the use information indicating that the information has already been used, thereby detecting the illegal use. Furthermore, even if the receiver or the third party makes a copy of the signature information and rewrites the use information into reasonable contents, the corresponding blind information cannot be generated. Therefore, an illegal use can be objectively proved by comparing the rewritten use information with the blind information.

Thus, by generating signature information using the authentication information which can be repeatedly recalled only by the user, and the use information for protection of the authentication information against an illegal use, the present invention can have much higher security than the method in which a user signature and seal are used.

FIG. 2 shows the configuration of the signature system using a two-dimensional bar code. The signature system shown in FIG. 2 comprises a user terminal unit 11 (personal computer, etc.), a bar code reader 12 of a receiver, and a certification unit 13 (server, etc.) or the third party.

When a user presents a receiver with the identification information indicating the authentication, the user converts necessary information into two-dimensional bar codes 14 and 15 in the terminal unit 11 and manage the codes such that the signature information of digital data can replace a seal. In addition, necessary information for verification of signature information is entered in a database 16 of the certification unit 13 through a network. The two-dimensional bar code 14 corresponds to the above described authentication information, and the two-dimensional bar code 15 corresponds to the above described program.

When the two-dimensional bar codes 14 and 15 are presented by the user, the receiver reads them through the bar code reader 12, and the bar code reader 12 generates signature information for authentication of the user. At this time, the bar code reader 12 requests the certification unit 13 to verify the signature information through a network, receives the verification result, and presents the receiver with the result.

The certification unit 13 corresponds to an official organization which issues a seal registration certificate of a registered seal, and proves the legality of the signature information from the view point of the third party according to the information entered in the database 16. Therefore, in the signature system containing the certification unit 13, it is assumed that authentication information is used instead of a registered seal, and the system is suitable for a case in which a user and a receiver process an important transaction.

FIG. 3 shows the configuration of the bar code reader 12. The bar code reader shown in FIG. 3 comprises a read device 21, a communications device 22, a control device 23, a storage device 24, a display device 25, a timer 26, and a random number generator 27.

The read device 21 reads the information of the two-dimensional bar codes 14 and 15, and inputs the information to the storage device 24 through the control device 23. The communications device 22 communicates with the certification unit 13, etc. through a network, and the display device 25 presents a receiver with necessary information. The timer 26 generates the current date and time information, and the random number generator 27 generates random numbers. The date and time information and random numbers are used as the above described use information. The control device 23 controls the operation of other devices.

Figure 4:
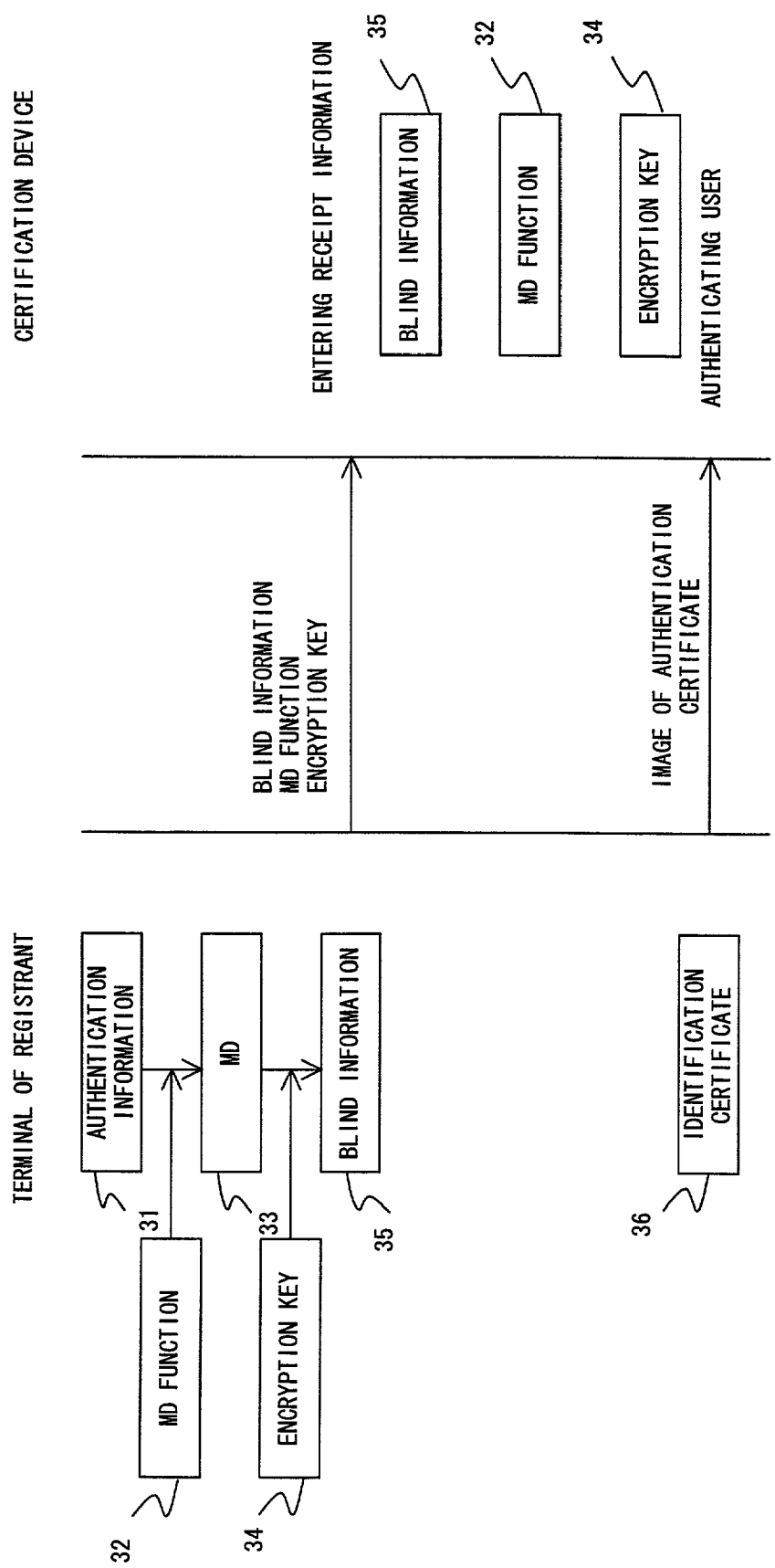
FIG. 4 shows the registering process (1)
Figure 5:
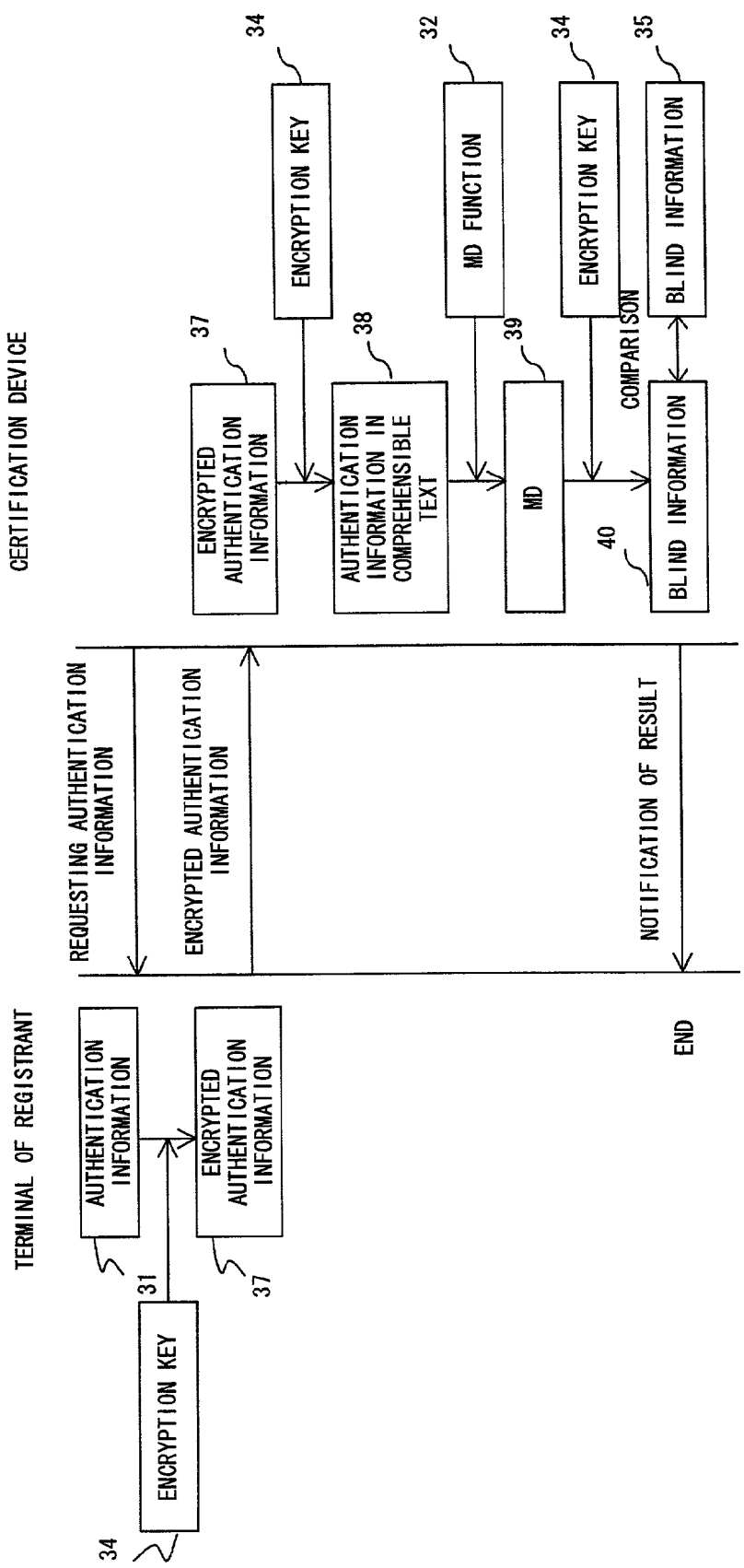
FIG. 5 shows the registering process (2)

FIGS. 4 and 5 show the processes of a user entering the information for verification. First, the terminal unit 11 applies a message digest function (MD function) 32 to authentication information 31 input by a user who is a registrant. The MD function 32 is a unidirectional function such as a hash function, etc. The authentication information 31 cannot be read from the MD 33.

Next, the terminal unit 11 encrypts the MD 33 using an encryption key 34, and generates blind information 35. For example, a DES (data encryption standard) using the same encryption key for both encryption and decryption is used as an encryption algorithm. The terminal unit 11 transmits the blind information 35, the MD function 32, and the encryption key 34 to the certification unit 13. The certification unit 13 enters the information in the database 16.

A registrant inputs an image of an identification certificate 36 such as a passport, a driver license, etc. to the terminal unit 11, and transmits it to the certification unit 13 for authentication. If the authentication is accepted, the identification certificate 36 is immediately removed.

Then, the certification unit 13 requests the terminal unit 11 for the authentication information 31 to determined whether or not the blind information 35 belongs to the registrant. In response to the request, the registrant re-inputs the authentication information 31, and the terminal unit 11 encrypts the authentication information 31 generates encrypted authentication information 37, and transmits it to the certification unit 13.

The certification unit 13 decrypts the encrypted authentication information 37 using the encryption key 34 stored in the database 16, and obtains authentication information incomprehensible text 38. Furthermore, it generates an MD 39 by applying the MD function 32 stored in the database 16 to the authentication information 38, and generates blind information 40 by encrypting the generated MD 39 using the encryption key 34. Then, the certification unit 13 compares the obtained blind information 40 with the blind information 35 stored in the database 16.

If the blind information 40 matches the blind information 35, the terminal unit 11 is notified that the entering process has been normally terminated. If they do not match each other, then the information entered in the database 16 is nullified, and the terminal unit 11 is notified that the entering process has been suspended. Therefore, only when the registrant re-enters the correct authentication information 31, the blind information 35, the MD function 32, and the encryption key 34 can be entered in the database 16. The authentication information 38, the MD 39, and the blind information 40 are removed immediately after being used.

Figure 6:
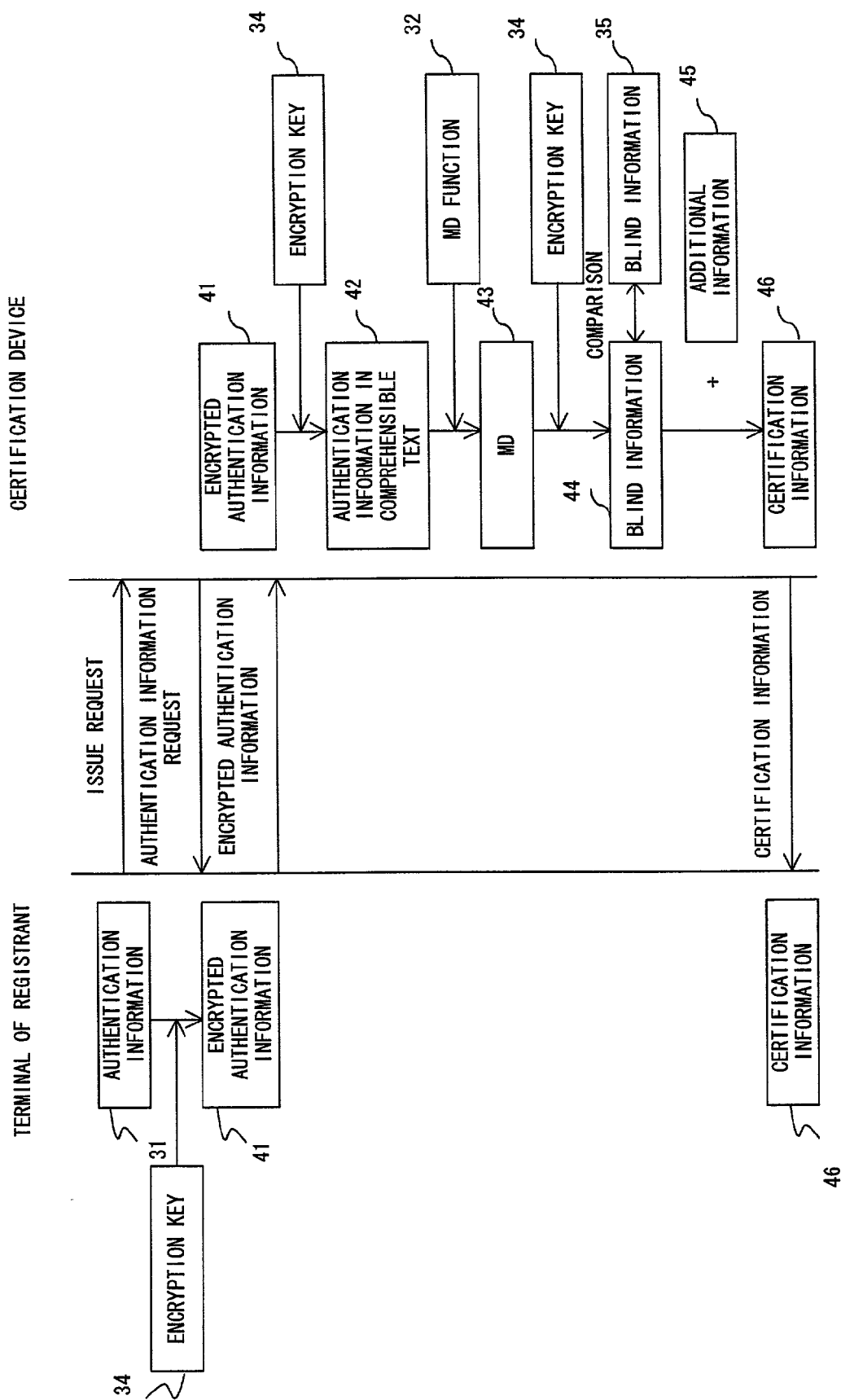
FIG. 6 shows the certificate issuing process.

Next, when the registrant requests an issue of a certificate for authentication, the process shown in FIG. 6 is performed.

First, when the terminal unit 11 transmits the request to issue the certificate to the certification unit 13, the certification unit 13 requests the terminal unit 11 to send the authentication information 31. In response to the request, the terminal unit 11 encrypts the authentication information 31 using the encryption key 34, generates encrypted authentication information 41, and transmits the generated information to the certification unit 13.

The certification unit 13 performs the process shown in FIG. 5 to verify the encrypted authentication information 41. First, the encrypted authentication information 41 is decoded using the encryption key 34 stored in the database 16 to obtain authentication information incomprehensible text 42. Furthermore, it applies the MD function 32 stored in the database 16 to the authentication information 42 to generate an MD 43, and generates blind information 44 by encrypting the information using the encryption key 34. The obtained blind information 44 is compared with the blind information 35 stored in the database 16.

At this time, if the blind information 44 matches the blind information 35, the issue date and time of a certificate, the name of issuing organization, the effective term, etc. are added to the blind information 44 as additional information 45, and generates certification information 46. The certification information 46 is transmitted to the terminal unit 11, the additional information 45 is entered in the database 16, and the process terminates. The authentication information in comprehensible text 42, the MD 43, and the blind information 44 are removed immediately after being used. If the blind information 44 does not match the blind information 35, it is assumed that the requester is different from the registrant, and the certification information 46 is not issued.

Thus, the certification unit 13 can generate blind information from given authentication information at any time, compares it with the blind information 35 to determine whether or not the authentication information can be accepted.

Figure 7:
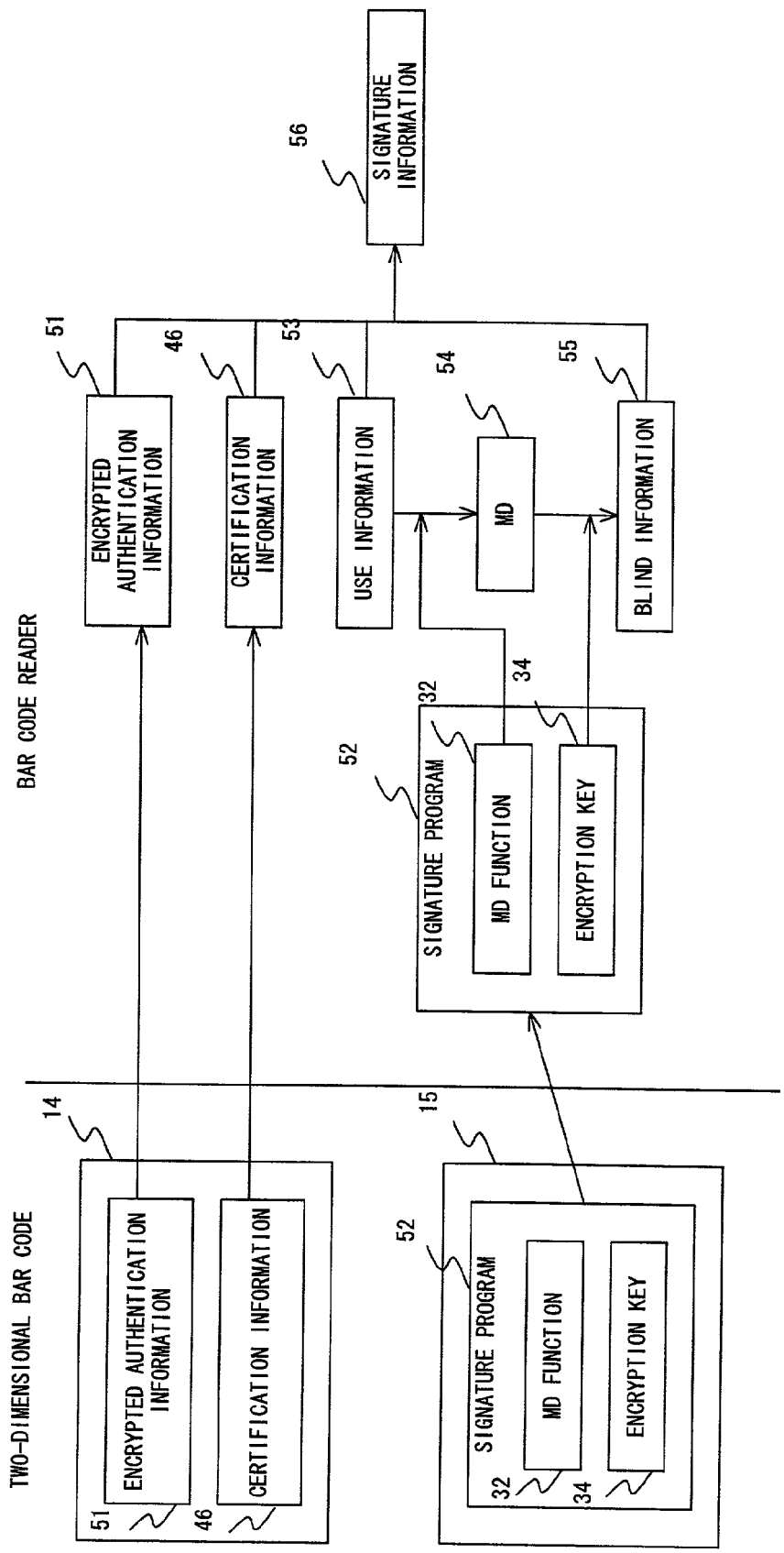
FIG. 7 shows the first reading process.

Described below is the process performed when a user presents a receiver with a two-dimensional bar code. FIG. 7 shows a process of reading a two-dimensional bar code containing the certification information 46. When a user inputs the authentication information 31, the terminal unit 11 generates encrypted authentication information 51 as in the case of the encrypted authentication information 41 shown in FIG. 6, and outputs it together with the certification information 46 to the two-dimensional bar code 14. In addition, the terminal unit 11 outputs the signature program 52 containing the MD function 32 and the encryption key 34 to the two-dimensional bar code 15.

The bar code reader 12 reads the information of the two-dimensional bar codes 14 and 15, stores them in the storage area of the storage device 24, and then executes a signature program 52. The signature program 52 first obtains date and time data from the timer 26, or random number data from the random number generator 27, and uses them as use information 53. Then, the signature program 52 applies the MD function 32 to the use information 53 to generate MD 54, and generates blind information 55 by encrypting the MD 54 using the encryption key 34.

Next, the encrypted authentication information 51, the certification information 46, the use information 53, and the blind information 55 are collected as signature information 56, and stored in the storage device 24. Then, the signature program 52 in the storage device 24 removes itself, thereby terminating the process.

The bar code reader 12 cannot verify the validity of the signature information 56 because the authentication information 31 in comprehensible text cannot be read from the encrypted authentication information 51 and the certification information 46 contained in the signature information 56. Accordingly, at a request from a receiver, the certification unit 13 is requested to verify the signature information 56.

Figure 8:
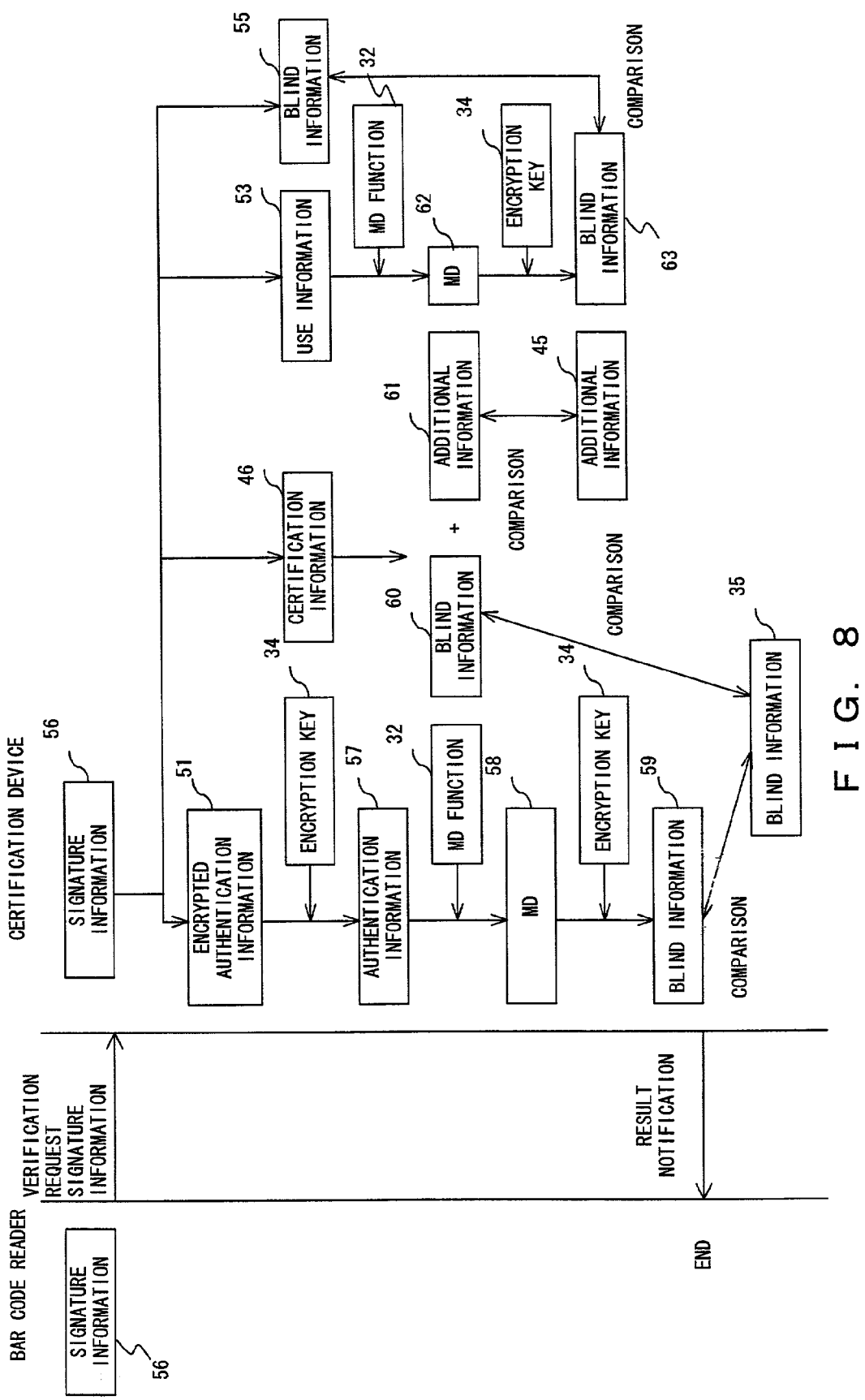
FIG. 8 shows the verifying process.

FIG. 8 shows the above described verifying process. When the bar code reader 12 transmits a verification request together with the signature information 56 to the certification unit 13, the certification unit 13 retrieves the encrypted authentication information 51, the certification information 46, the use information 53, and the blind information 55 from the signature information 56.

The certification unit 13 first decodes the encrypted authentication information 51 using the encryption key 34 to generate authentication information 57 in comprehensible text, applies the MD function 32 to the authentication information 57 to generate an MD 58, and encrypts the MD 58 using the encryption key 34 to generate blind information 59. The obtained blind information 59 is compared with the blind information 35 stored in the database 16.

If the blind information 59 matches the blind information 35, then the certification information 46 is divided into blind information 60 and additional information 61, the blind information 60 is compared with the blind information 35, and the additional information 61 is compared with the additional information 45 stored in the database 16.

If the blind information 60 matches the blind information 35, and the additional information 61 matches the additional information 45, then the MD function 32 is applied to the use information 53 to generate an MD 62, and the MD 62 is encrypted using the encryption key 34 to generate blind information 63. The obtained blind information 63 is compared with the blind information 55.

If the blind information 63 matches the blind information 55, the signature information 56 is assumed to indicate the correct identification information about the user, and the bar code reader 12 is notified of the bar code reader 12.

If the blind information 59 does not match the blind information 35, the blind information 60 does not match the blind information 35, the additional information 61 does not match the additional information 45, or the blind information 63 does not match the blind information 55, then it is assumed that the signature information 56 is not correct, and the information is provided for the bar code reader 12. The authentication information 57, the MD 58, and the blind information 59 are removed immediately after they have been used.

In the method of authenticating a user by a conventional authentication station, the MD function, the public key, the personal information, etc. of a user are published, thereby frequently failing in protecting the privacy of the user. In addition, the user has to manage his or her private key, and communicate his or her correspondent while confirming the digital signature.

On the other hand, in the signature system shown in FIG. 2, the minimal information is entered as comprehensible text, and the original authentication information 31 is not entered as is, but is entered in the form of the blind information 35 incomprehensible to others. Therefore, the privacy of the user can be protected, and the authentication information 31 can be protected against the illegal use by others.

In addition, the two-dimensional bar code 14 can store the information about the transaction between a user and a receiver so that the certification unit 13 can settle the transaction between them. In this case, the receiver uses the display device 25 of the bar code reader 12, confirms the transaction information read from the two-dimensional bar code 14, and requests the certification unit 13 to verify the signature information 56 if the contents are correct.

When the certification unit 13 determines that the signature information 56 is correct, it settles the transaction. Thus, for example, money information is transferred between the accounts of the user and the receiver opened in a banking facility.

In the signature system shown in FIG. 2, the user outputs the certification information 46 issued by the third party through the two-dimensional bar code 14. In a transaction less significant than receiving goods from a home delivery service, etc., the certification information 46 and the certification unit 13 are not always required. In addition, simpler information can be used as the authentication information 31, and it is not always necessary to encrypt the information and output it to the two-dimensional bar code 14.

Figure 9:
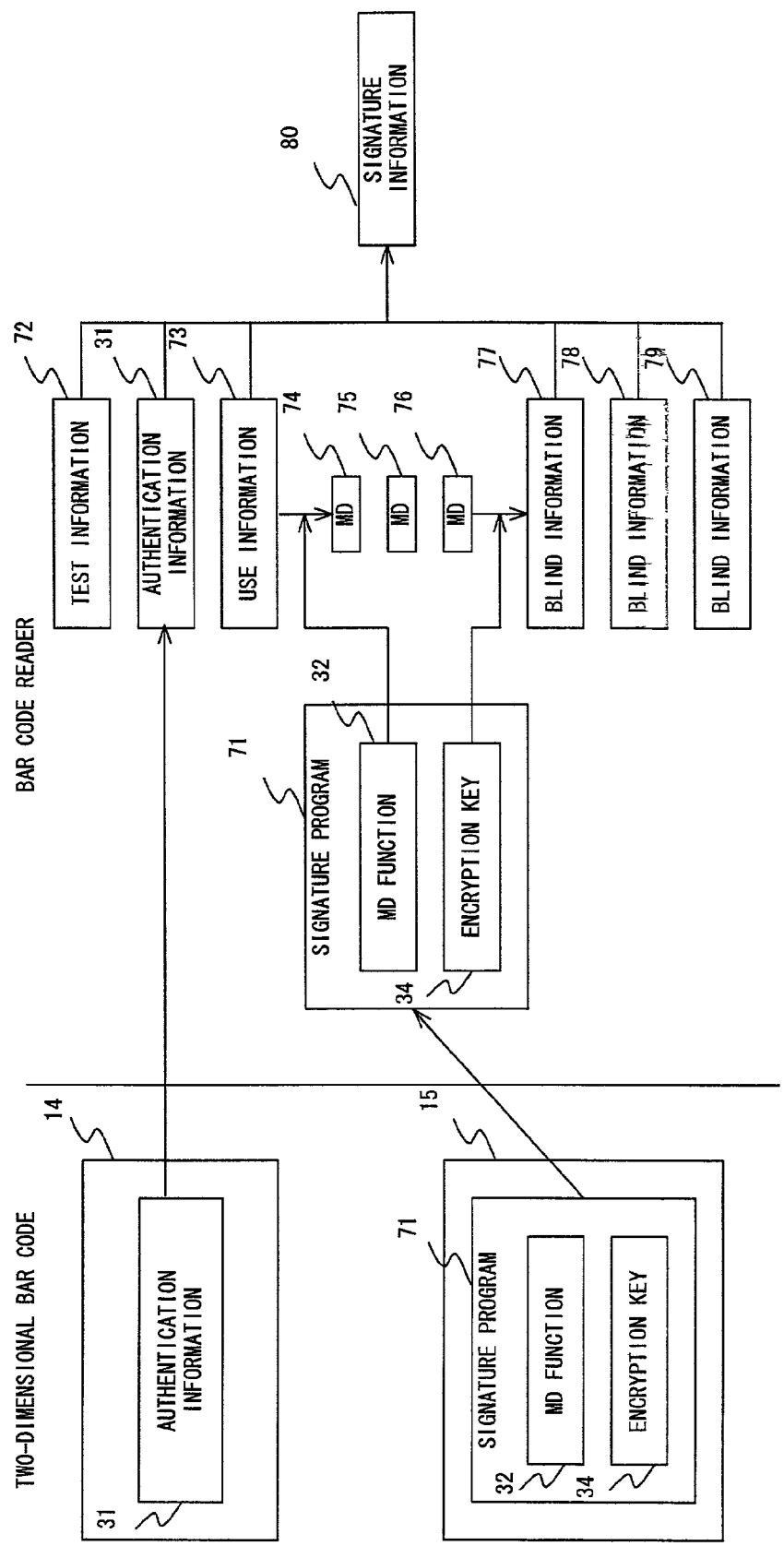
FIG. 9 shows the second reading process.

FIG. 9 shows a process of reading a two-dimensional bar code not containing the certification information 46. When the user input the authentication information 31, the terminal unit 11 outputs it to the two-dimensional bar code 14, and outputs the signature program 71 containing the MD function 32 and the encryption key 34 to the two-dimensional bar code 15.

In this example, it is assumed that a user and his or her family use a two-dimensional bar code replacing a receipt seal. When the user himself or herself uses it, the personal information such as the name, the address, the telephone number, etc. is used as the authentication information 31. When a member of the user family uses it, only the family name is used as the authentication information 31.

The bar code reader 12 reads the information of the two-dimensional bar codes 14 and 15, stores the information in the storage area of the storage device 24, and then executes a signature program 71. The signature program 71 generates the blind information of test information 72, the authentication information 31, and use information 73. The test information 72 is appropriate information for testing the MD function 32 and the encryption key 34, and the use information 73 is, for example, the date and time data obtained from the timer 26.

First, the MD function 32 is applied to each of the test information 72, the authentication information 31, and the use information 73 to generate MD 74, 75, and 76, and then the information is encrypted using the encryption key 34 to generate blind information 77, 78, and 79. The blind information 77, 78, and 79 are blind information corresponding respectively to the test information 72 in comprehensible text, the authentication information 31, and the use information 73.

Then, signature information 80 is generated by collecting the test information 72, the authentication information 31, the use information 73, and the blind information 77, 78, and 79. The generated signature information 80 is stored in the storage device 24, and then the signature program 71 in the storage device 24 is removed, thereby terminating the process.

Figure 10:
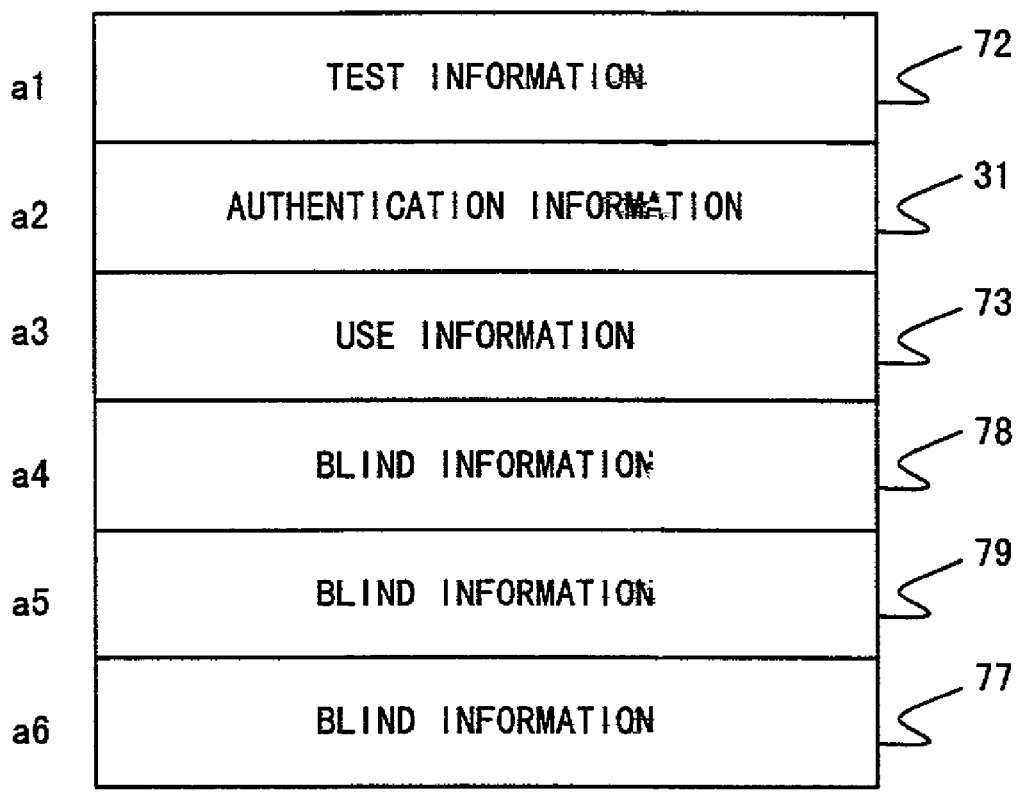
FIG. 10 shows the signature information.

FIG. 10 shows the signature information 80 stored in the storage area of the storage device 24. In FIG. 10, the test information 72, the authentication information 31, the use information 73, the blind information 78, 79 and 77 are respectively stored at addresses a1, a2, a3, a4, a5, and a6. Before reading the two-dimensional bar codes 14 and 15, non-use information is written at the address a3, and it is rewritten into reading date and time data.

In this signature system, when a receiver or a third party copies stored signature information for another use, the illegal use can be detected because the current date and time is different from the date and time of the use information. Furthermore, when a receiver or a third party uses the date and time of the use information after changing them into the current date and time, the corresponding blind information cannot be generated. Therefore, the illegal use can be detected by comparing the rewritten use information with the blind information.

Figure 11:
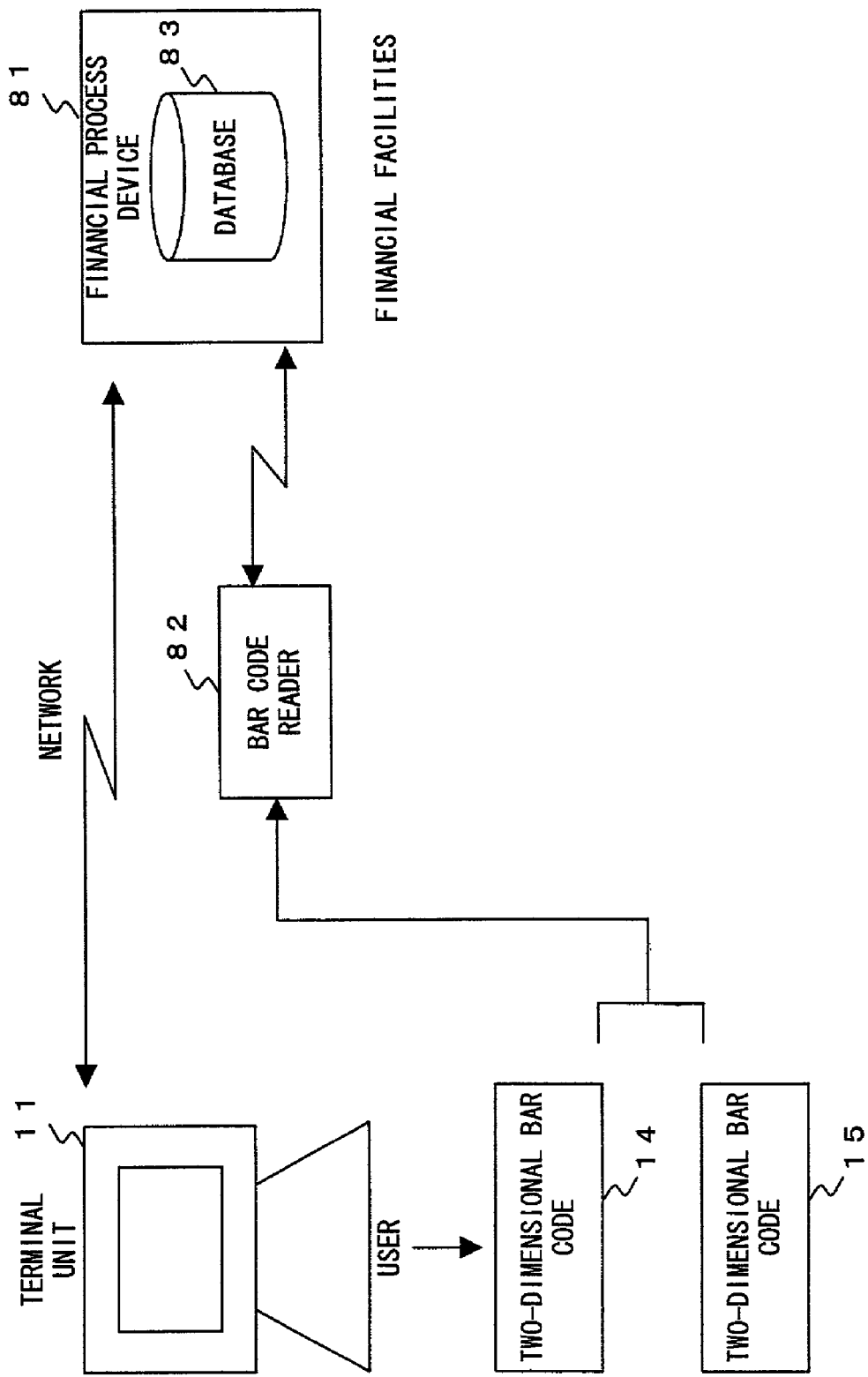
FIG. 11 shows the configuration of the second signature system.

Described below is the signature system for processing a transaction between a user using a two-dimensional bar code and banking facilities such as banks, etc. FIG. 11 shows the configuration of the signature system. The signature system shown in FIG. 11 comprises the terminal unit 11, a financial process device 81 (server, etc.), and a bar code reader 82 in financial facilities. The bar code reader 82 has the same configuration as that shown in FIG. 3.

When a user presents a transaction document to banking facilities, necessary information is managed after being converted into the two-dimensional bar codes 14 and 15 in the terminal unit 11 so that the signature information of digital data can be used instead of a seal. In addition, the necessary information for verification of signature information is entered in a database 83 of the financial process device 81 through a network.

The process of entering information in the financial process device 81 is the same as the processes shown in FIGS. 4 and 5. If the certification information 46 shown in FIG. 6 has been issued from the certification unit 13, then the certification information 46 can be transmitted instead of transmitting the identification certificate 36 for authentication of the user as shown in FIG. 4.

When the user presents the two-dimensional bar codes 14 and 15, the bar code reader 82 reads them, generates signature information, and authenticates the user. The process of reading the two-dimensional bar codes 14 and 15 is the same at the process shown in FIG. 7. However, in this case, the certification information 46 is not necessarily output to the two-dimensional bar code 14, and does not have to be contained in the signature information 56.

The bar code reader 82 requests the financial process device 81 to verify the signature information and settle the transaction, receives the process result, and presents it to the user. The financial process device 81 verifies the validity of the signature information according to the information entered in the database 83. The process of verifying the signature information is the same as the process shown in FIG. 8. When the certification information 46 is not contained, the verification is omitted. If the validity of the signature information is verified, the financial process device 81 settles the transaction. Thus, for example, the money information (balance) of the account of the user opened in the financial facilities is updated.

In the signature system, unlike the signature system shown in FIG. 2, the blind information of the authentication information of the user is managed by the financial facilities, that is, the correspondent, and is used for authentication of the user. Therefore, the authentication information is assumed to be used instead of a banking seal.

In addition, to improve the security of transactions, the user password can be preliminarily entered in the database 83. In this case, when a transaction is started, the user presents the two-dimensional bar codes 14 and 15, and inputs his or her password in the financial process device 81 through a terminal of the financial process device 81 or an ATM, etc. Then, the financial process device 81 refers to the database 83, and verifies the input password.

Furthermore, with the signature system shown in FIG. 11, a home banking system and a firm banking system can be realized by transmitting and receiving information directly between the terminal unit 11 and the financial process device 81.

First, when a user transmits a transaction request from the terminal unit 11 to the financial process device 81, the financial process device 81 requests the terminal unit 11 to transmit the authentication information 31. When the user inputs the authentication information 31 in response to the request, the terminal unit 11 encrypts the authentication information 31 using the encryption key 34, generates encrypted authentication information 91, and transmits it to the financial process device 81.

The financial process device 81 decodes the encrypted authentication information 91 using the encryption key 34 stored in the database 83, and obtains authentication information 92 in comprehensible text. Furthermore, the financial process device 81 generates an MD 93 by applying the MD function 32 stored in the database 83 to the authentication information 92, and generates blind information 94 by encrypting the generated MD 93 using the encryption key 34. The obtained blind information 94 is compared with the blind information 35 stored in the database 83.

At this time, when the blind information 94 matches the blind information 35, the financial process device 81 settles the requested transaction, and notifies the terminal unit 11 of the transaction result. If they do not match each other, then it does not settle the transaction, and notifies the terminal unit 11 that the transaction has been suspended. Therefore, only when a user inputs correct authentication information 31, a transaction can be settled. The authentication information 92, the MD 93, and the blind information 94 are removed immediately after they are used.

With the signature system shown in FIG. 11, like the signature system shown in FIG. 2, the minimal information is entered in comprehensible text while the authentication information 31 is entered in the form of the blind information 35 which cannot be recognized by others. Therefore, the privacy of the use can be guaranteed, and an illegal use of the authentication information 31 by others can be avoided.

Next, the configuration and the operations of the above described signature system are described below in detail by referring to FIGS. 13 through 24.

Figure 13:
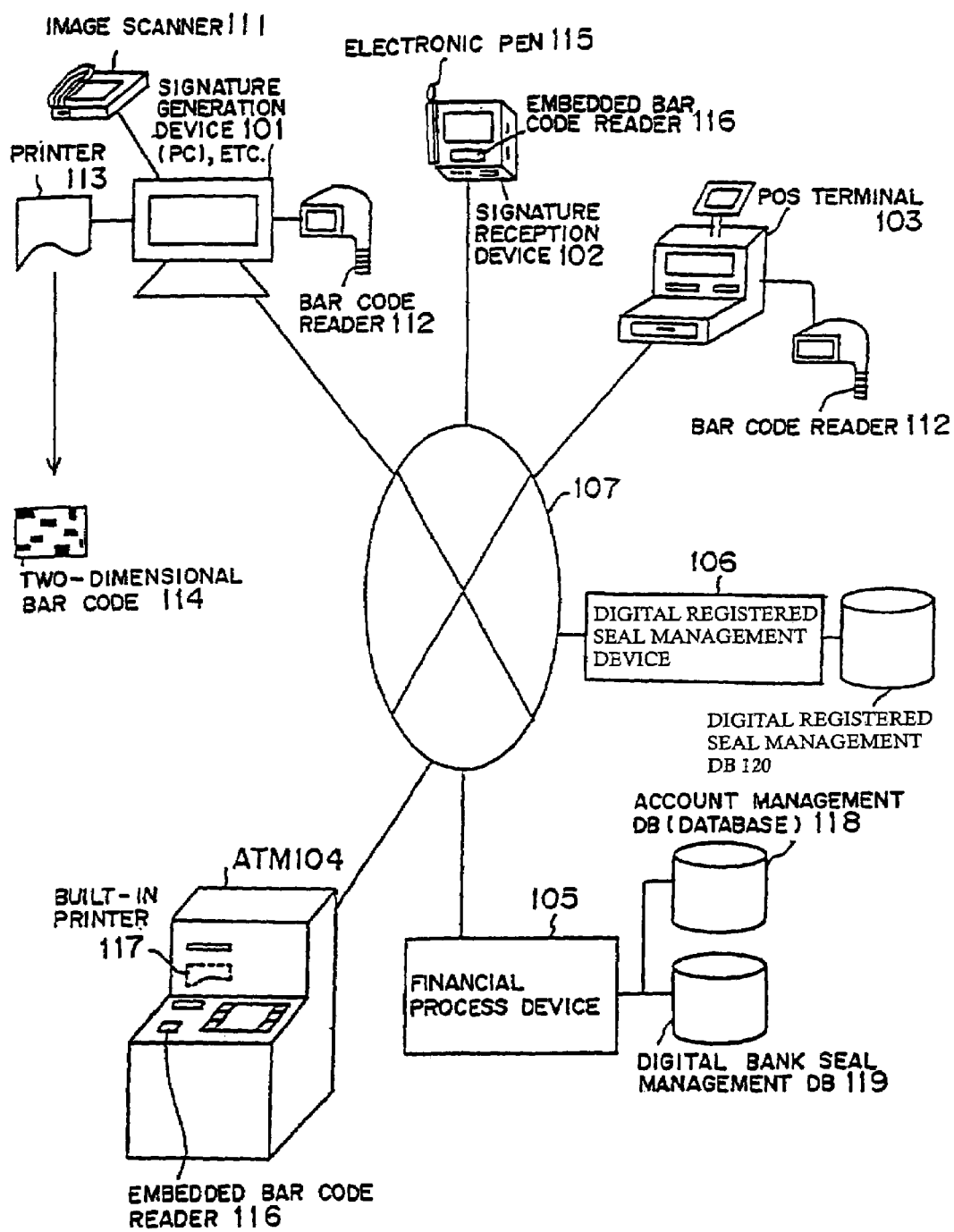
FIG. 13 shows the configuration of the third signature system.

FIG. 13 shows the configuration of the signature system obtained by integrating various aspects of the digital signature at levels 1 through 3. The system shown in FIG. 13 comprises a signature generation device 101, a signature reception device 102, a POS (point of sale) terminal 103, an ATM 104, a financial process device 105, and a digital registered seal management device 106. They are connected through a network 107.

The signature generation device 101 is a personal computer, etc. of a user, and comprises an image scanner 111, a bar code reader 112, and a printer 113. The signature generation device 101 is a PC, etc. of a user, issues an entry request, an issue request, and outputs a bar code for a digital signature at level 1 (entered digital seal) and a digital signature at level 2 (digital banking seal), and generates a digital signature at level 3 (digital receipt seal) and outputs a bar code.

Figure 12:
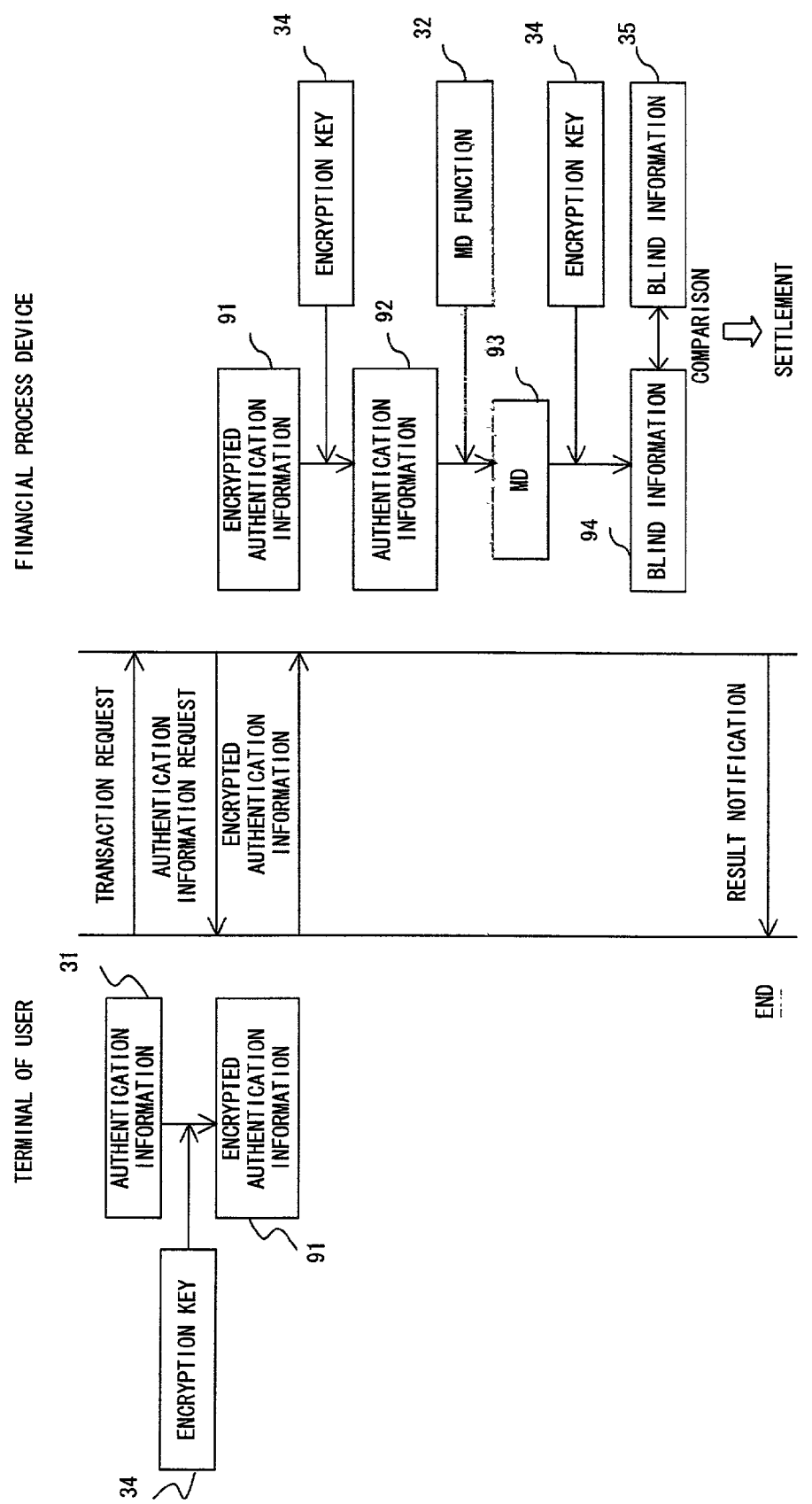
FIG. 12 shows the transaction process.

The bar code reader 112 corresponds to, for example, the bar code reader 12 shown in FIG. 12, and a two-dimensional bar code 114 output from the printer 113 corresponds to the two-dimensional bar codes 14 and 15 shown in FIG. 2. The image scanner 111 is used to retrieve image data such as the image of a seal, etc.

The signature reception device 102 comprises an electronic pen 115 and an embedded bar code reader 116, and carried for use by a staff of home delivery service. When an article is delivered to a user, etc., the signature reception device 102 receives the two-dimensional bar code 114 from the user. The embedded bar code reader 116 corresponds to, for example, the bar code reader 112 shown in FIG. 2.

The POS terminal 103 comprises the bar code reader 112, and receives the two-dimensional bar code 114 from the user at a shop, etc. which is provided with the POS terminal 103. The ATM 104 comprises the embedded bar code reader 116 and a built-in printer 117, and is used in various transactions (application for a transfer of an account, etc.) which require a digital banking seal in financial facilities, etc.

The financial process device 105 comprises an account management DB (database) 118 and a digital bank seal management DB 119, and performs a process relating to a digital banking seal such as entering a digital banking seal to be performed when a new account is opened. The digital registered seal management device 106 comprises a digital registered seal management DB 120, and performs a process relating to a registered digital seal such as entering a registered digital seal in an official process.

Figure 14:
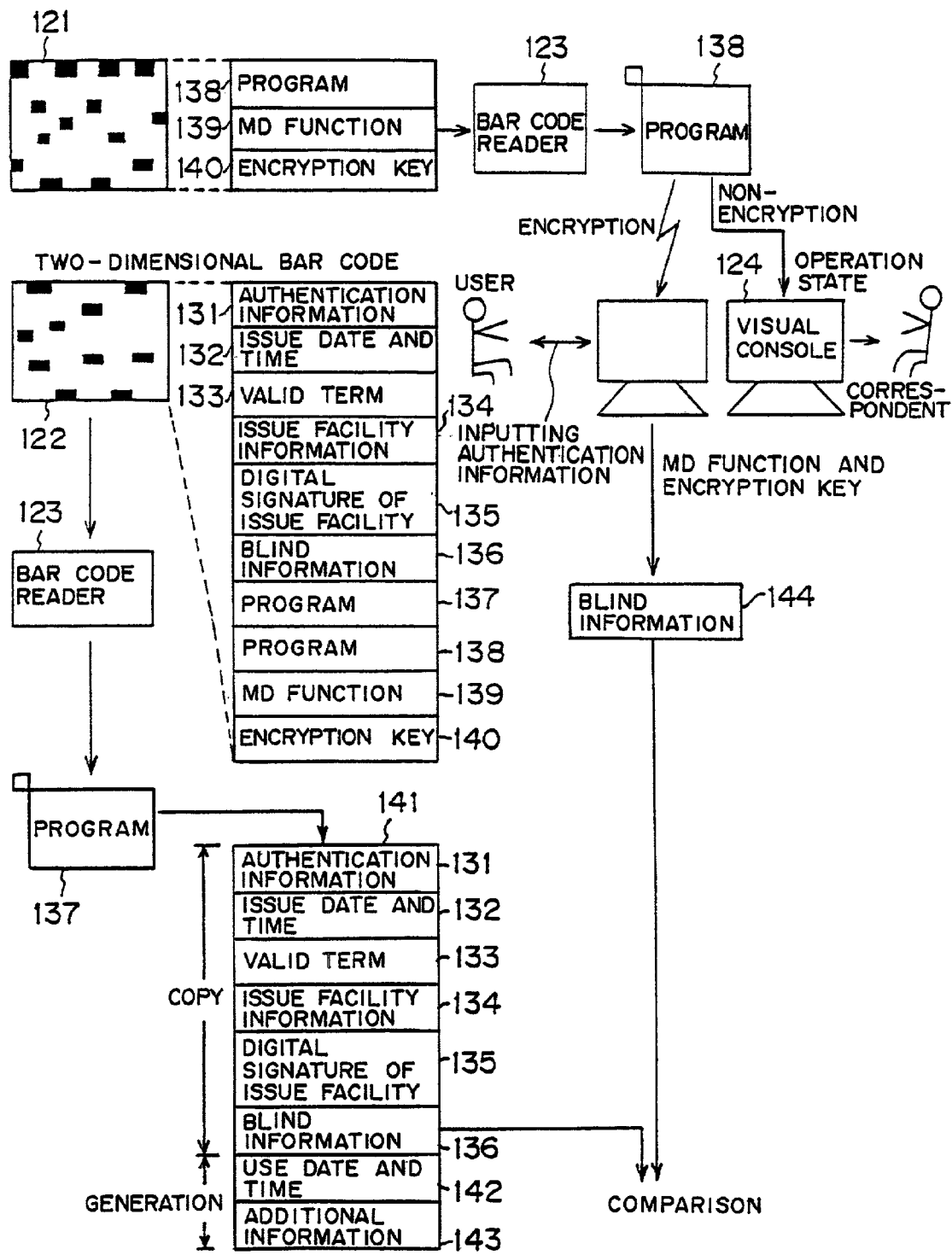
FIG. 14 shows the user authentication process.

FIG. 14 shows an example of an authenticating process using a registered digital seal and a digital banking seal. When the authenticating process is offline, two-dimensional bar codes 121 and 122 are read by a bar code reader 123 (the bar code reader 112 or 116 of the correspondent), and the PC of the correspondent performs the authenticating process according to the information. When the authenticating process is online, the two-dimensional bar code 122 is read by the bar code reader 123, and the PC of the correspondent performs the authenticating process according to the information.

The two-dimensional bar code 122 is presented from the user to the correspondent in response to the certification information issued by the financial process device 105 or the digital registered seal management device 106. The certification information contains authentication information 131, an issue date and time 132, a valid term 133, an issue facility information 134, a digital signature 135 of an issuing organization, blind information 136 of the authentication information 131, a program 137, a program 138, an MD function 139, and an encryption key 140.

When the PC of the correspondent reads the certification information, the program 137 is automatically activated, and the program 137 generates certification information 141 for the process. In the data contained in the certification information 141, the data of the authentication information 131 through the blind information 136 are copied from the read data, and a use date and time 142 and additional information 143 are newly generated. The use date and time 142 indicates the date and time when the certification information is read. In online processing, the user can be authenticated by comparing the generated certification information 141 with the preliminarily entered certification information.

The two-dimensional bar code 121 contains the program 138, the MD function 139, and the encryption key 140. In offline processing, the two-dimensional bar code 121 in addition to the two-dimensional bar code 122 is read, and the program 138 is automatically activated.

When the user inputs his or her authentication information, the program 138 generates blind information 144 of the authentication information using the read MD function 139 and the encryption key 140. Then, the user is authenticated by comparing the blind information 144 with the blind information 136 of the certification information 141. In addition, the program 138 presents the operation state to the correspondent through a visual console 124.

Figure 15:
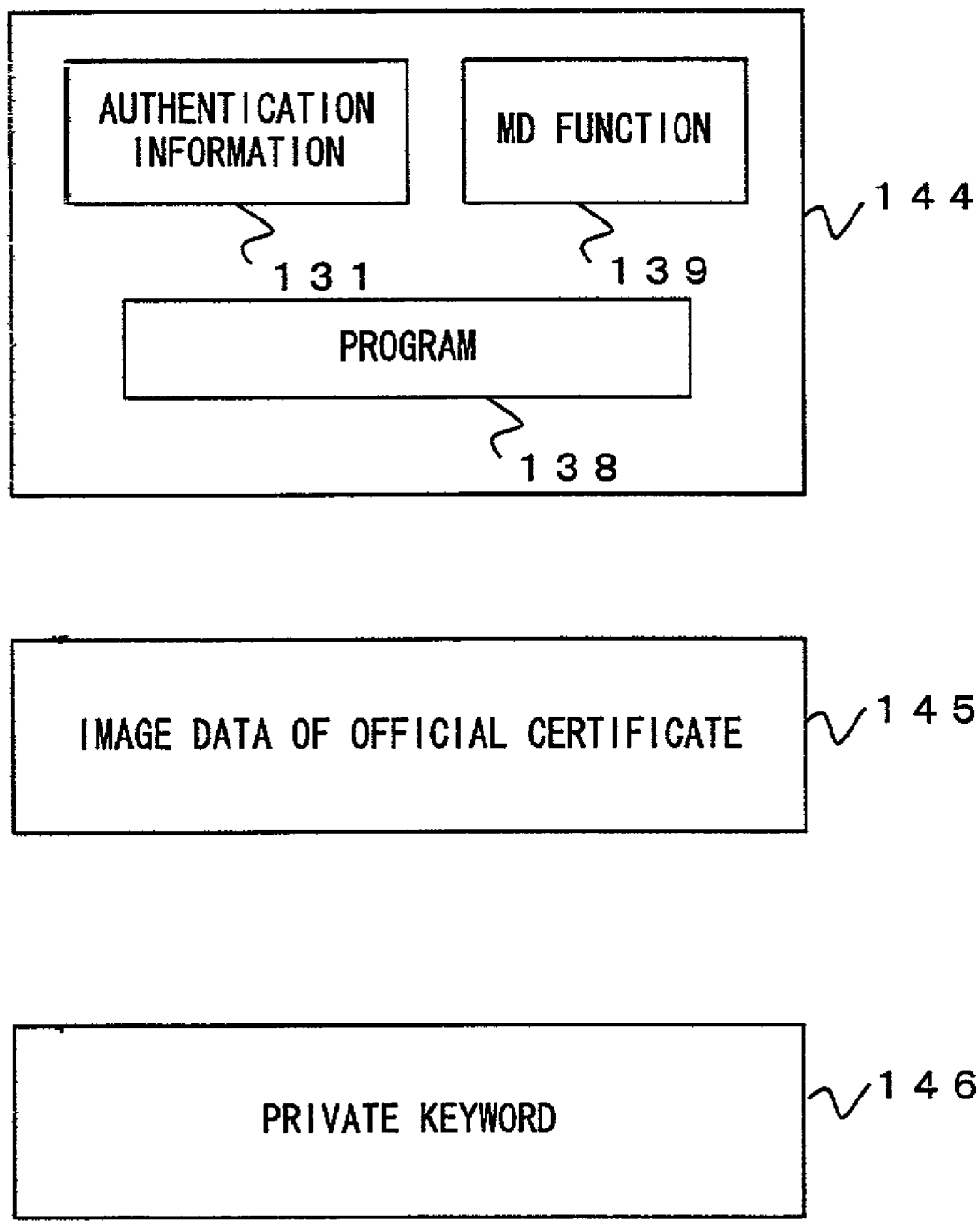
FIG. 15 shows the information for generation of a digital signature.

The information required in generating a digital signature depends on the level of the digital signature. For a registered digital seal, for example, three types of information as shown in FIG. 15 are combined. The blind information 144 contains the authentication information 131, the program 138, and the MD function 139. Information 145 is image data of an official certificate such as a driver license, a passport, etc. Information 146 is a private keyword of a user.

For a digital banking seal, the blind information 144 and the information 146 are combined. For a digital receipt seal, only the blind information 144 is used.

Figure 16:
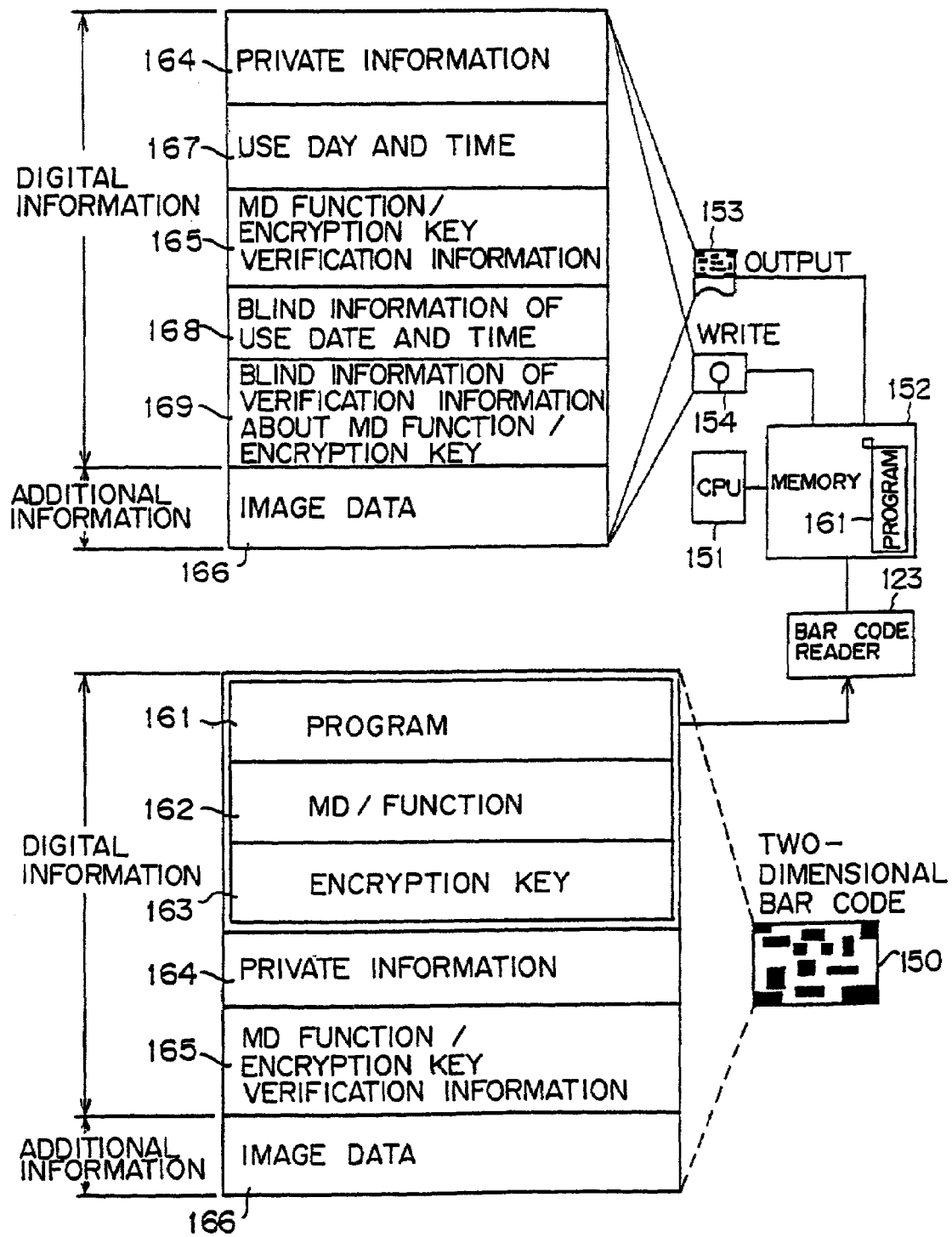
FIG. 16 shows the process of outputting a digital receipt seal.

FIG. 16 shows an example of a process of outputting a digital receipt seal. The original information about a digital receipt seal written to a two-dimensional bar code 150 contains a program 161 for a signature, an MD function 162 of a user, an encryption key 163 of a user, private information 164 (authentication information) of a user, MD function/encryption key verification information 165, and image data 166 (an image of a seal, a signature, a picture, etc.).

The original information is read by the bar code reader 123, and read to memory 152. A CPU (central processing unit) 151 executes the program 161, and the program 161 generates a digital receipt seal using the MD function 162 and the encryption key 163. The digital receipt seal can be output as a printout 153 in the two-dimensional bar code format or a text format, and also can be written to a portable storage medium 154.

The output digital receipt seal contains the private information 164, a use day and time 167, the MD function/encryption key verification information 165, blind information 168 of the use day and time 167, blind information 169 of the MD function/encryption key verification information 165, and the image data 166. The use day and time 167 corresponds to the use information, and indicates the date and time when the digital receipt seal is used.

Figure 17:
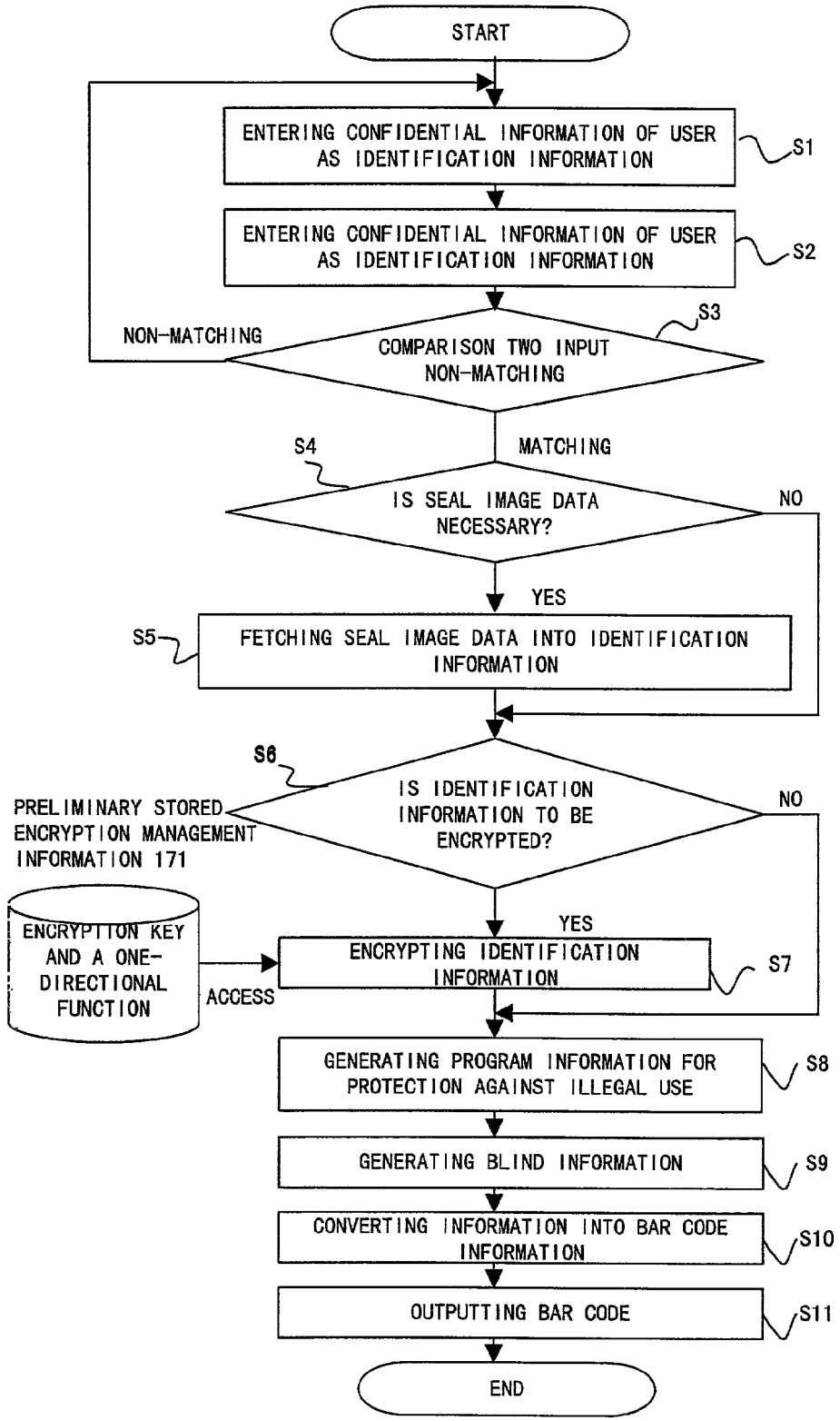
FIG. 17 is a flowchart of the process of outputting a two-dimensional bar code.

FIG. 17 is a flowchart of the process of outputting a two-dimensional bar code. First, a user inputs his or her confidential information as identification information (authentication information) to the signature generation device 101 (step S1), and inputs the same information again (step S2). The signature generation device 101 compares the information input in step S1 with the information input in step S2 (step S3). It they do not match each other, the inputting processes in steps S1 and S2 are repeated.

If the information input in step S1 matches the information input in step S2, then it is determined whether or not the seal image data is required (step S4). If the seal image data is required, then the seal image data is fetched to the identification information, and then it is determined whether or not the identification information should be encrypted (step S6).

If the identification information should be encrypted, then the preliminarily stored encryption management information 171 is accessed to retrieve an encryption key and a one-directional function (MD function), and encrypt the identification information (step S7).

Next, the program information for avoiding an illegal use is generated (step S8), the blind information of the identification information is generated (step S9), and the generated information is converted into bar code information (step S10). Then, the obtained bar code information is output (step S11), thereby terminating the process.

If it is determined in step S4 that no seal image is required, then the processes in and after step S6 are performed. If it is determined in step S6 that an encrypting process is not required, then the processes in and after step S8 are performed.

Figure 18:
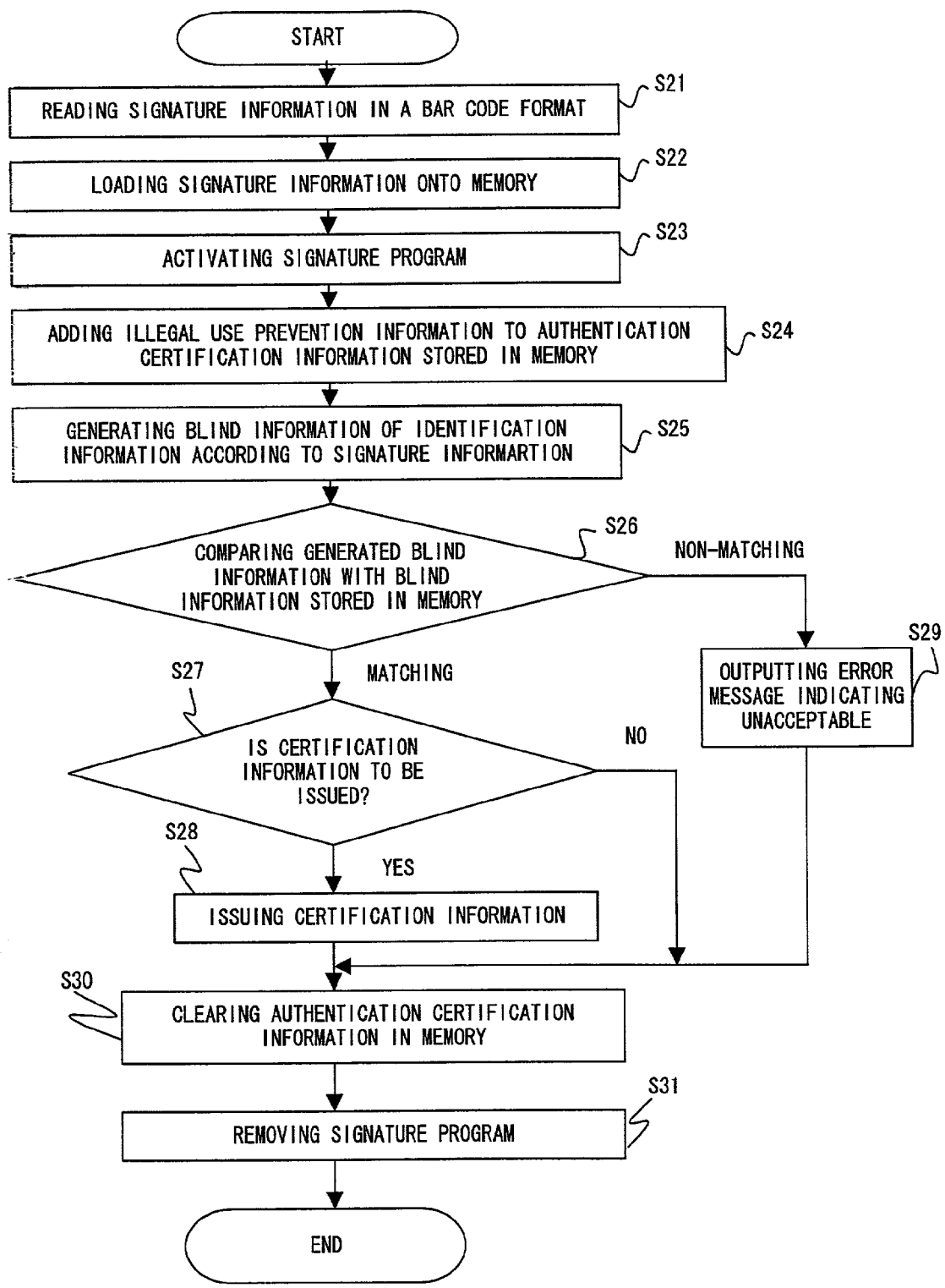
FIG. 18 is a flowchart of the process of reading a two-dimensional bar code, and the process of issuing certification information.

FIG. 18 is a flowchart of the process of reading a two-dimensional bar code, and issuing certification information. This process is performed by a system comprising the signature reception device 102, the POS terminal 103, a reading device such as the ATM 104, and a management device such as the financial process device 105 or the digital registered seal management device 106.

The system first reads the signature information presented in a two-dimensional bar code format (step S21), and loads the read information to the memory in the system (step S22). The read information contains the authentication certification information (identification information and certification information) and the signature program.

Then, the signature program is activated (step S23), the illegal use prevention information such as use information, etc. is added to the authentication certification information stored in the memory (step S24), and the blind information of the identification information is generated according to the read signature information (step S25).

Next, the generated blind information is compared with the blind information stored in the memory (step S26). When they match each other, it is determined whether or not certification information should be issued (step S27). If the certification information should be issued, then it is issued (step S28). Then, the authentication certification information in the memory is cleared (step S30), and the signature program removes itself from the memory (step S31), thereby terminating the process.

If it is determined in step S26 that the two pieces of blind information do not match each other, an error message indicating that the signature cannot be accepted is output (step S29), and the processes in and after step S30 are performed. If it is determined in step S28 that the certification information is not required, then the processes in and after step S30 are performed.

Figure 19:
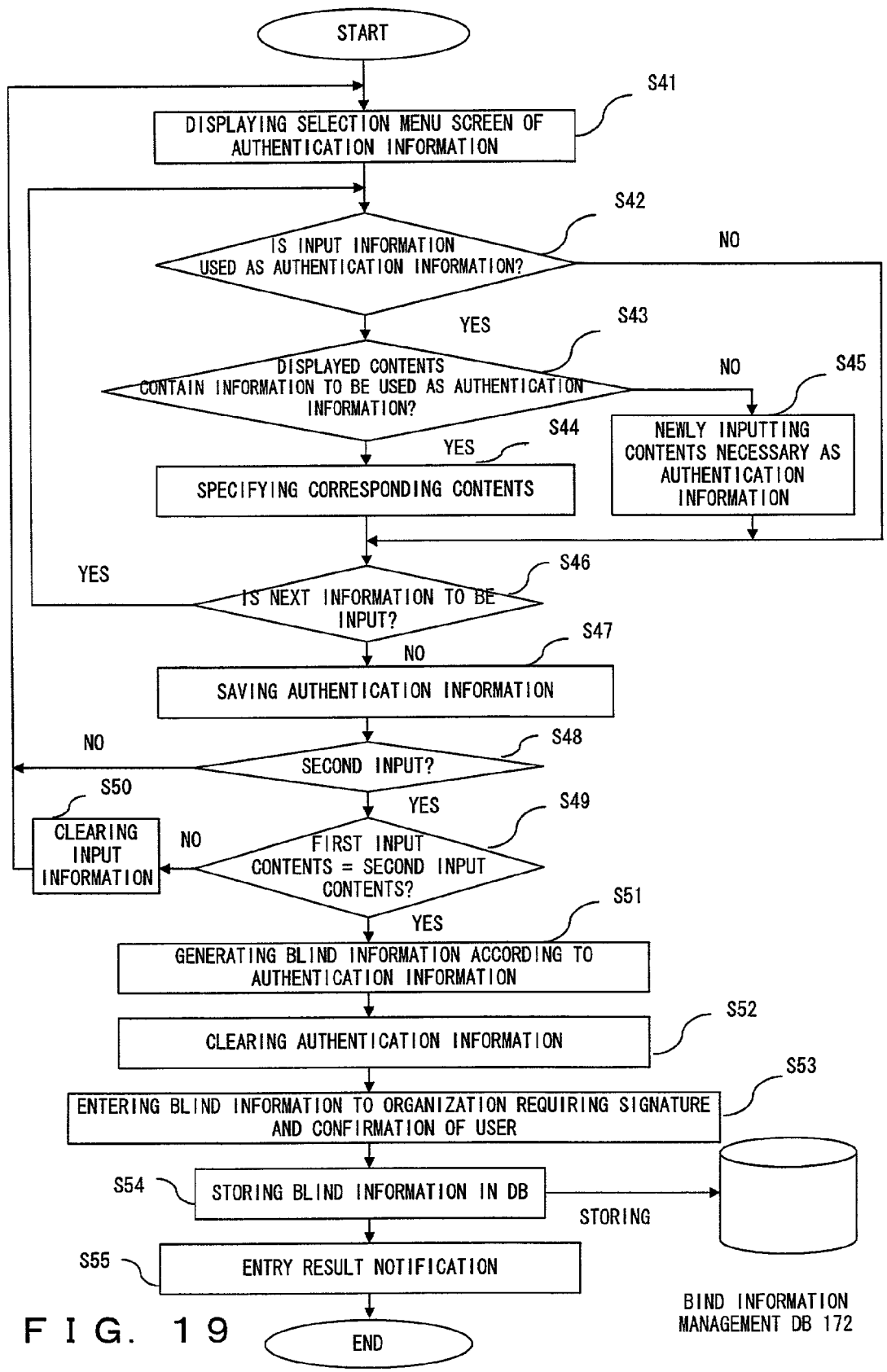
FIG. 19 is a flowchart of the process of entering blind information.

FIG. 19 is a flowchart of the process of entering blind information. First, the signature generation device 101 displays a selection menu screen for authentication information (step S41), and the user selects whether or not the input information is to be used as authentication information (step S42).

When the input information is used as authentication information, then the user selects whether or not the displayed contents include the contents to be used as authentication information (step S43). The displayed contents refer to predetermined information displayed based on the dictionary of each item (idiom, name of a person, poetry, etc.) of the authentication information.

If the contents to be used as authentication information are contained in the displayed contents, then the corresponding contents are specified (step S44). If they are not contained in the displayed contents, then the contents required as authentication information are newly input (step S45). For example, the input information is 4-character idiom, then the user directly inputs an idiom such as '<•o/oo☐ ŽÀ<A' in step S45. If the input information refers to a respectable person, then the name of the person is directly input.

Next, the user selects whether or not the next information is to be input (step S46). If the next information is to be input, then the processes in and after step S42 are repeated. In addition, if input information is not used as authentication information in step S42, then the process in step S46 is performed.

When the authentication information is completely input, the signature generation device 101 saves the input authentication information (step S47), and it is determined whether or not the authentication information has been input twice (step S48). If the authentication information has been input only once, the inputting process in and after step S41 is repeated. When the second intputting process is completed, the first input contents are compared with the second input contents (step S49).

Unless they match each other, the stored input information is cleared (step S50), and the inputting process in and after step S41 is repeated. If they match each other, then the blind information is generated according to the input authentication information (step S51), and the stored authentication information is cleared (step S52).

Next, blind information is entered in the organizations (banks, public offices, etc.) (step S53). Thus, the generated blind information is transferred to the management devices such as the financial process device 105, the digital registered seal management device 106, etc., and the management devices store the received blind information in a blind information management DB 172 (step S54). The blind information management DB 172 corresponds to the digital bank seal management DB 119 and the digital registered seal management DB 120.

Then, the management device notifies the signature generation device 101 of the entry result (step S55), thereby terminating the process. The same process is performed when information is entered from a device other than the signature generation device 101.

FIG. 20 is a flowchart of the process of authenticating a user according to authentication information when a transaction is processed. First, the ATM 104 displays the authentication information selection menu screen (step S61), and the user selects whether or not input information is to be used as authentication information (step S62).

When the input information is to be used as authentication information, the user inputs the first authentication information (step S63), and selects whether or not the next information is to be input (step S64). When the next information is to be input, the processes in and after step S62 are repeated. If it is selected not to use input information as authentication information, the process in step S64 is performed.

When the authentication information is completely input, the ATM 104 generates the blind information according to the input authentication information (step S65), and clears the authentication information in the memory (step S66).

When the generated blind information is transferred to a management device such as the financial process device 105 and the digital registered seal management device 106, the management device reads the blind information of the user from the blind information management DB 172 (step S67). Then, the received blind information is compared with the read blind information (step S68). If they match each other, a message that a user has been authenticated is transmitted to the ATM 104.

In response to this, the ATM 104 outputs a message that a user has been authenticated (step S69), and a screen of a transaction to be processed is displayed (step S70). Then, the user performs a necessary operation for the transaction (step S71), thereby terminating the process.

If the two pieces of blind information do not match each other in step S68, the management device transmits a message that the user is not authenticated, the ATM 104 outputs the message (step S72), thereby terminating the process. The similar process is performed when the authentication information is input from a device other than the ATM 104.

Figure 21:
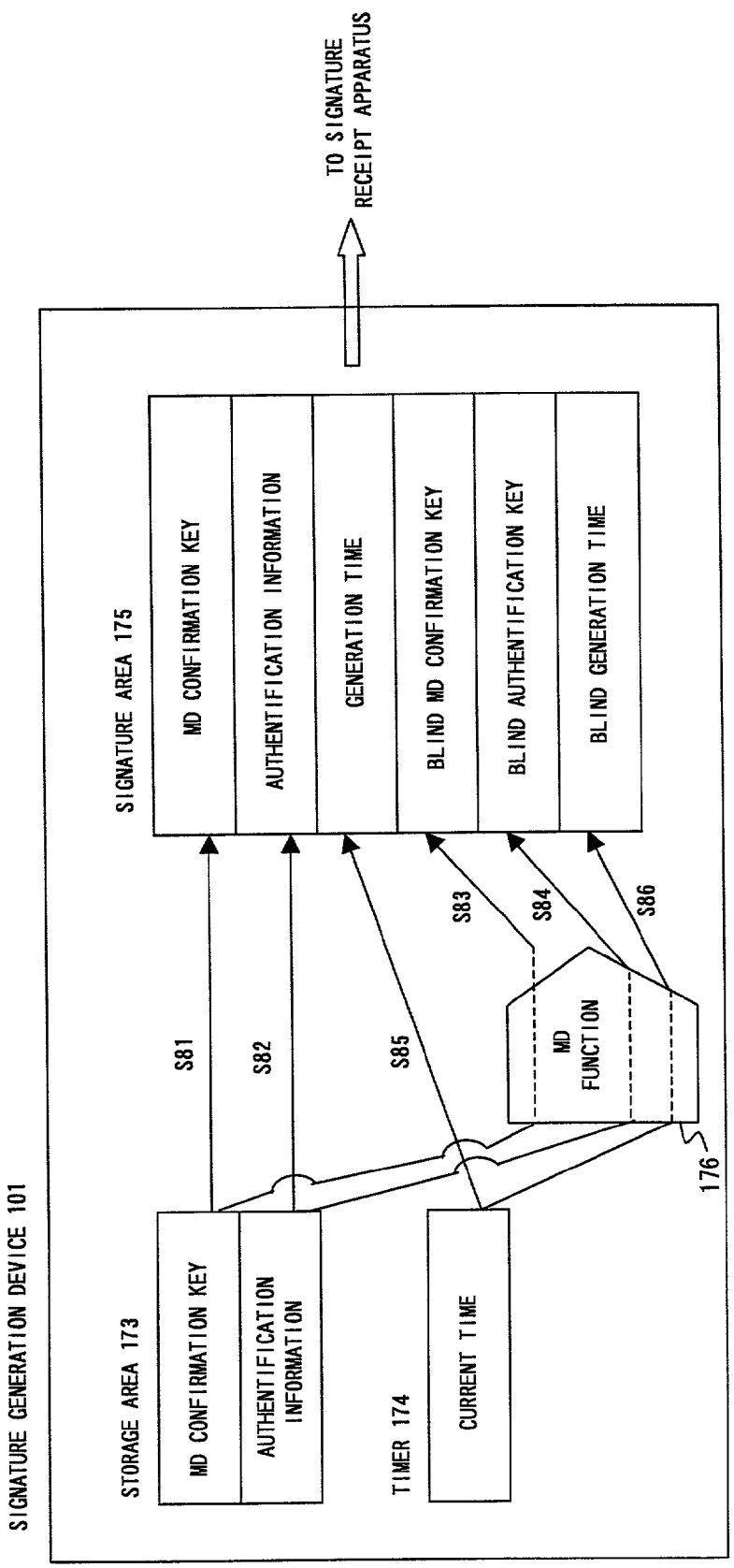
FIG. 21 shows the process of generating a digital seal.
Figure 22:
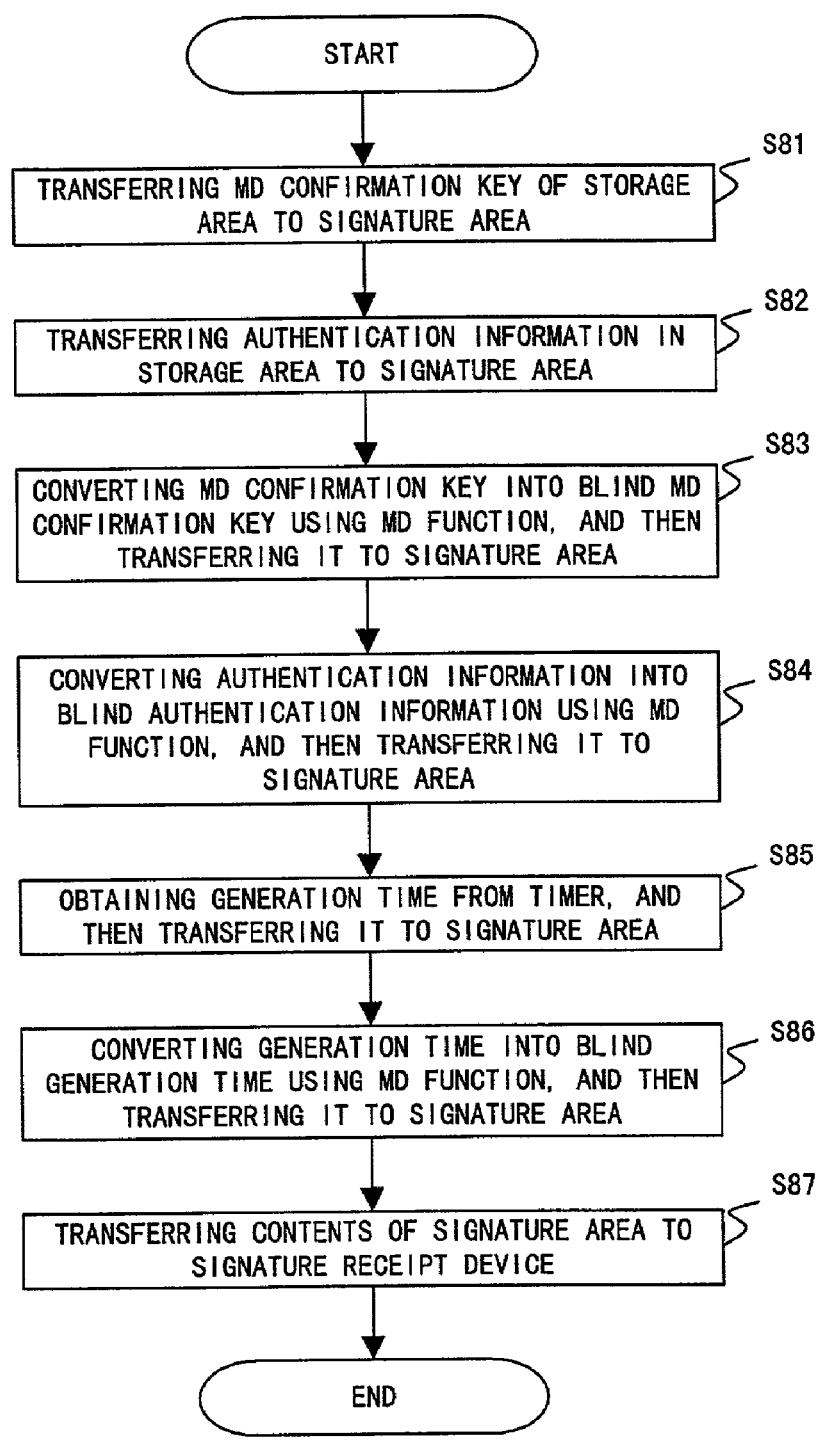
FIG. 22 is a flowchart of the process of generating a digital seal.

FIG. 21 shows the process of generating a variable digital receipt seal by the signature generation device 101. FIG. 22 is a flowchart of the process. The signature generation device 101 first transfers an MD confirmation key of a storage area 173 to a signature area 175 (step S81), and the authentication information to the signature area 175 (step S82).

Next, using the MD function 176, the MD confirmation key is converted in to an MD confirmation key, and is transmitted to the signature area 175 (step S83). Then, using an MD function 176, the authentication information is converted into blind authentication information, and is transferred to the signature area 175 (step S84).

Then, the current time obtained from a timer 174 is transferred to the signature area 175 as a generation time (step S85), and the generation time is converted into blind generation time, and is transferred to the signature area 175 (step S86). Then, the contents of the signature area 175 is transferred to the signature reception device 102 as a digital receipt seal (step S87), thereby terminating the process.

Figure 23:
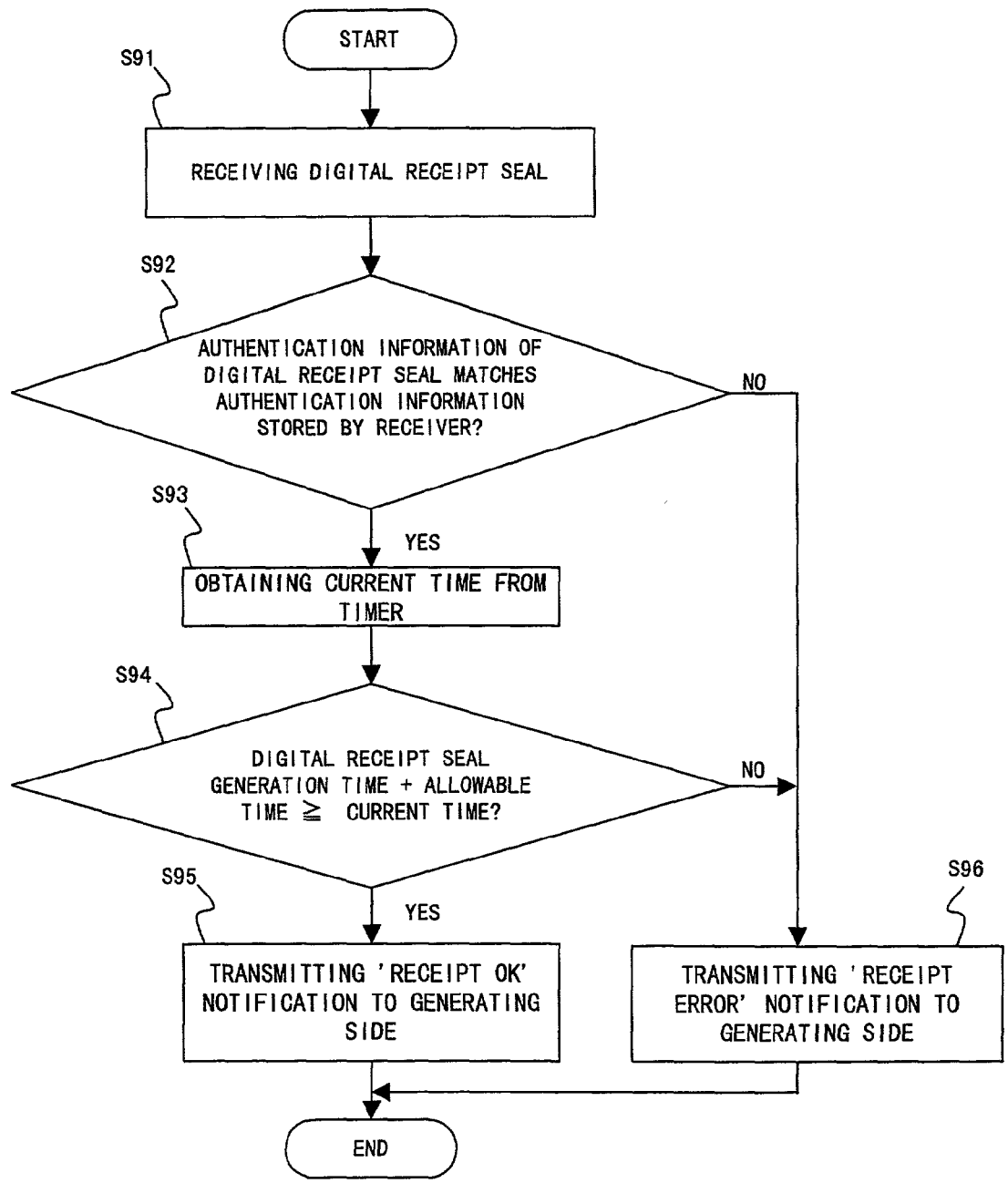
FIG. 23 is a flowchart of the process of checking an illegal operation on the receiver side.

FIG. 23 is a flowchart of the process of the signature reception device 102 checking an illegal use. The signature reception device 102 first receives a digital receipt seal (step S91), and compares the authentication information therein with the authentication information stored on the receiving side (step S92).

When they match each other, the current time is obtained from the timer (step S93), a predetermined allowable time is added to the generation time contained in the digital receipt seal, and the addition result is compared with the current time (step S94). If the addition result the current time, then the receipt OK notification is transmitted to the generation side (step S95), thereby terminating the process. In addition, if the addition result<the current time, then a reception error notification is transmitted to the generation side (step S96), thereby terminating the process.

If the two pieces of authentication information do not match each other in step S92, then the process in step S96 is performed, thereby terminating the process. The similar process is performed also when the device other than the signature reception device 102 receives the digital reception seal.

Figure 24:
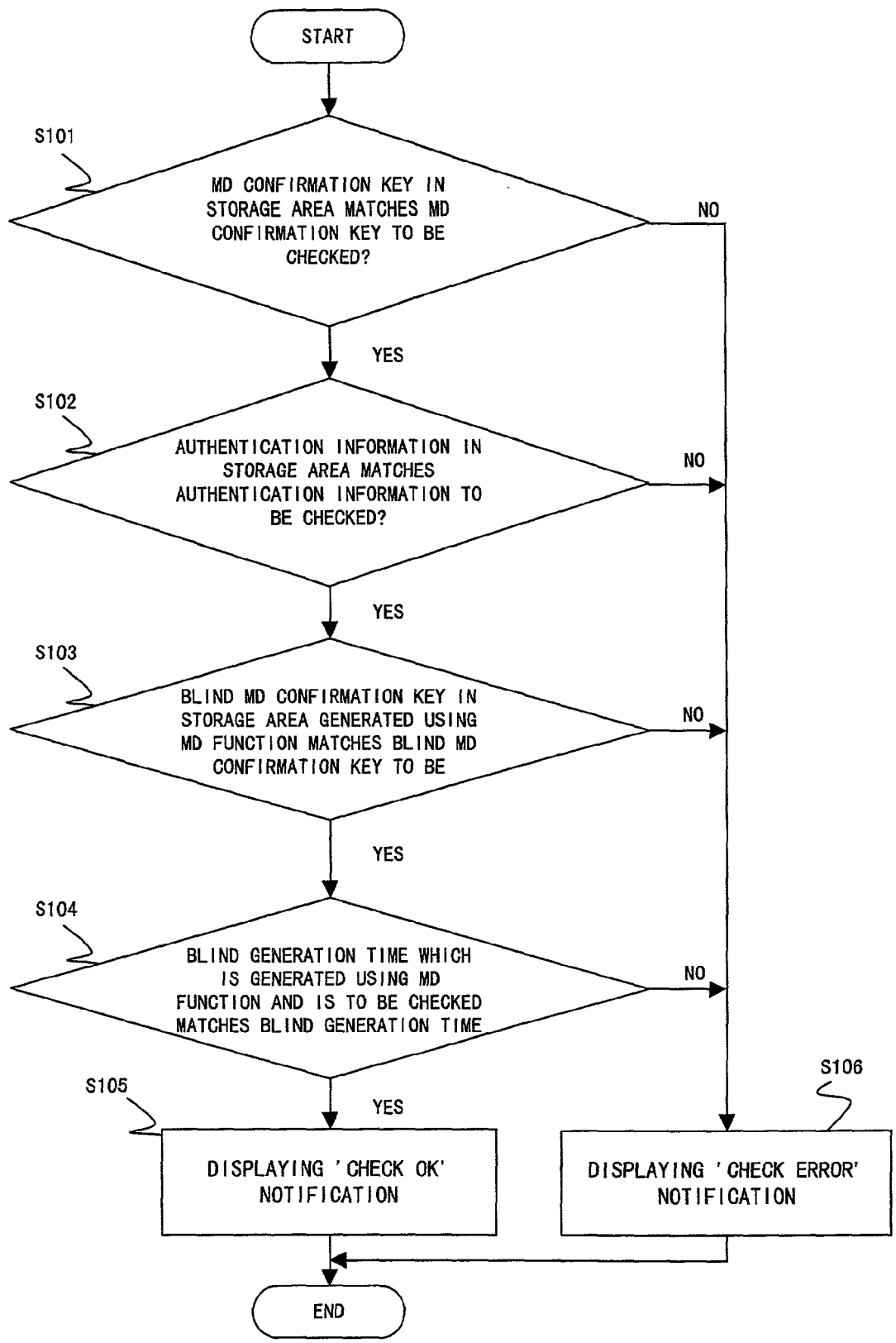
FIG. 24 is a flowchart of the process of checking an illegal operation on the generation side.

FIG. 24 is a flowchart of the process of the signature generation device 101 checking an illegal use. This process is performed when the user checks his or her own digital receipt seal. The signature generation device 101 first compares the MD confirmation key of the storage area 173 with the MD confirmation key of the digital receipt seal to be checked so that an illegal amendment to the MD confirmation key can be detected (step S101).

If they match each other, then the authentication information of the storage area 173 is compared with the authentication information of the digital receipt seal to be checked so that an illegal amendment to the authentication information can be detected (step S102). If they match each other, then the MD confirmation key of the storage area 173 is converted into blind data using the MD function 176 to confirm that the same MD function is used for the information. Then, the obtained result is compared with the blind MD confirmation key to be checked (step S103).

If they match each other, then the generation time to be checked is converted into blind data using the MD function 176 to detect an illegal amendment to the generation time, and the obtained result is compared with the blind generation time to be checked (step S104) If they match each other, then a check OK notification is displayed (step S105), thereby terminating the process.

Unless the two pieces of the compared data match each other in step S101, S102, S103, or S104, a check error notification is displayed (step S106), thereby terminating the process.

According to the above described embodiments, two-dimensional bar code is used as a medium for use in presenting authentication information. In addition, an optional storage medium such as a one-dimensional bar code, an IC (integrated circuit) memory card, etc. can be used. When an IC memory card is used, a processing device provided with a memory card interface instead of a bar code reader is used.

Furthermore, it is not necessary to use an encryption algorithm in a common key system when blind information and encrypted authentication information are generated. In this case, an encrypt algorithm such as an RSA (Rivest-Shamir-Adleman), etc. in which different encryption keys are used between an encrypting process and a decrypting process can be adopted. It is obvious that different encryption algorithms can be used in generating blind information and encrypted authentication information.

The terminal unit 11, the bar code reader 12, and the certification unit 13 shown in FIG. 2, the financial process device 81, and the bar code reader 82 shown in FIG. 11, and the signature generation device 101, the signature reception device 102, the POS terminal 103, the ATM 104, the financial process device 105, and the digital registered seal management device 106 can be configured using, for example, an information processing device (computer) as shown in FIG. 25.

The information processing device shown in FIG. 25 comprises a CPU (central processing unit) 181, memory 182, an input device 183, an output device 184, an external storage device 185, a medium drive device 186, and a network connection device 187. These units are interconnected through a bus 188.

The memory 182 contains ROM (read-only memory), RAM (random access memory), etc., and stores a program and data for use in a process. The CPU 181 performs various processes of the above described signature system by executing a program using the memory 182.

The input device 183 is, for example, a keyboard, a pointing device, a touch panel, etc., and is used in inputting necessary instruction and information. The output device 184 is, for example, a display, a printer, etc., and outputs a process result, a two-dimensional bar code, etc.

The external storage device 185 can be, for example, a magnetic disk device, an optical disk device, a magneto-optical disk device, etc. The external storage device 185 can also be used as the database 16 shown in FIG. 2, the database 83 shown in FIG. 11, and the databases 118, 119, and 120 shown in FIG. 13.

The medium drive device 186 drives a portable storage medium 189, and accesses the stored contents therein. The portable storage medium 189 can be an optional computer-readable storage medium such as a memory card, a floppy disk, a CD-ROM (compact disk read-only memory), an optical disk, a magneto-optical disk, etc. The portable storage medium 189 stores the above described program and data, and loads them to the memory 182 as necessary for use.

The network connection device 187 communicates with an external device through an optional network (circuit) such as a LAN (local area network). An information processing device receives the above described program and data from an external device as necessary through the network connection device 187, and can use them after loading them to the memory 182.

FIG. 26 shows a computer-readable storage medium capable of providing a program and data for the information processing device shown in FIG. 25. The program and data stored in the portable storage medium 189 and an external database 190 are loaded onto the memory 182. Then, the CPU 181 executes the program using the data to perform a necessary process.

According to the present invention, the identification information of a user can be easily and securely presented to a receiver using digital data such as a two-dimensional bar code, etc. In addition, since the identification information does not have to be stored in a storage medium for management, and a user inputs the information each time he or she is required to present it, an illegal use by other persons can be avoided. Therefore, it guarantees the security higher than using user's signature or registered seal.

What is claimed is:

1. A signature system presenting a receiver with signature information of a user, comprising:
   an input unit inputting authentication information of the user; and
   an output unit outputting information for generation of the signature information according to the input authentication information, the output information including a signature program, and
   wherein the signature program generates first blind information from illegal use prevention information for protection against illegal use, and enters both the first blind information and the illegal use prevention information in the signature information, and
   wherein the output information is prepared such that, after the signature information is generated according to the output information to present the signature information to the receiver, the signature program can be removed from memory.

2. The system according to claim 1,
   wherein said signature program contains a one-directional function and an encryption key, used in generating blind information from said illegal use prevention information.

3. The system according to claim 1, wherein said input unit inputs image data of an image of a seal as the authentication information.

4. The signature system according to claim 1, wherein said output unit outputs the information for generation of the signature information in a format readable by a bar code reader.

5. A computer-readable storage medium storing a program used to direct a computer to perform a method comprising:
   inputting identification information of a user;
   generating output information for generation of signature information of the user according to the input identification information;
   generating a signature program for generating blind information from illegal use prevention information, and entering both the blind information and the illegal use prevention information in the signature information; and
   outputting the output information and the signature program in a format readable by a bar code reader, and wherein the output information is prepared such that, after the signature information is generated according to the output information, the signature program can be removed from memory.

6. A signature system presenting a receiver with signature information of a user, comprising:
input means for inputting the identification information of the user; and
output means for outputting information for generation of the signature information according to the input identification information, including a signature program, in a format readable by a bar code reader, and
wherein the signature program generates blind information from illegal use prevention information, and enters both the generated blind information and the illegal use prevention information in the signature information, and
wherein the output information is prepared such that, after the signature information is generated according to the output information to present the signature information to the receiver, the signature program can be removed from memory.

7. A signature system, comprising:
management unit for managing first blind information generated from authentication information, one-directional function and encryption key which are registered by a user;
receiving unit for receiving signature information which contains the authentication information;
generation unit for generating second blind information from the authentication information contained in the signature information, using the one-directional function and the encryption key;
comparison unit for comparing the first blind information with the second blind information to produce a first comparison result; and
verification unit for verifying the signature information according to the first comparison result;
wherein said receiving unit receives signature information which contains illegal use prevention information and third blind information generated from the illegal use prevention information;
said generation unit further generates fourth blind information generated from the illegal use prevention information contained in the signature information, using the one-directional function and the encryption key;
said comparison unit further compares the third blind information with the fourth blind information to produce a second comparison result; and
said verification unit verifies the signature information according to the second comparison result.

8. A signature system according to claim 7,
wherein said receiving unit receives from the user, authentication information and the first blind information generated from authentication information, and
wherein said generation unit generates third blind information from the authentication information, using the one-directional function and the encryption key, and
wherein said comparison unit compares the first blind information with the third blind information to produce a second comparison result, and
further comprising entering unit for entering the first blind information in said management unit, if the first and third blind information are identical according to the second comparison result.

9. A signature system according to claim 8,
wherein said entering unit deletes the authentication information received by said receiving unit, after entering the blind information.

10. A signature system presenting signature information of a user to a receiver, comprising:
a reading unit reading information, including program information, for generation of the signature information, where the program information can be removed from memory after the signature information is generated according to the information for generation of the signature information; and
a generation unit generating blind information from illegal use prevention information for protection against illegal use, and generating the signature information which contains the blind information and the illegal use prevention information, according to the program information;
wherein said reading unit further reads authentication information of the user,
wherein said generation unit further includes the authentication information of the user in the signature information, and
further comprising:
a management unit managing first blind information of the authentication information;
a comparison unit generating second blind information from the authentication information contained in the signature information, comparing the second blind information with the first blind information and obtaining a comparison result; and
a verification unit verifying the signature information based on the comparison result.

11. The system according to claim 10, further comprising a timer unit generating date and time information used as the illegal use prevention information.

12. The system according to claim 10,
further comprising an issue unit issuing certification information containing the first blind information of the authentication information,
wherein said reading unit reads the certification information,
wherein said generation unit further includes the certification information in the signature information, and
wherein said comparison unit compares the second blind information generated by said comparison unit with the first blind information contained in the certification information.

13. The signature system according to claim 10, wherein said reading unit reads the program information in a bar code format.

14. The signature system according to claim 10,
wherein said program information contains a one-directional function and an encryption key, and
wherein said generation unit generates the blind information from the illegal use prevention information using the one-directional function and the encryption key.

15. The system according to claim 10,
wherein said comparison unit further generates blind information from said illegal use prevention information contained in the signature information, and compares the generated blind information with the blind information contained in the signature information.

* * * * *